US012585492B2

(12) United States Patent
Xiao et al.

(10) Patent No.: US 12,585,492 B2
(45) Date of Patent: Mar. 24, 2026

(54) MEMORY MANAGEMENT METHOD AND ELECTRONIC DEVICE

(71) Applicant: Honor Device Co., Ltd., Shenzhen (CN)

(72) Inventors: Mingpeng Xiao, Shenzhen (CN); Peng Li, Shenzhen (CN); Lu Li, Shenzhen (CN); Xiaofan Wan, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 545 days.

(21) Appl. No.: 17/928,546

(22) PCT Filed: May 23, 2022

(86) PCT No.: PCT/CN2022/094490
§ 371 (c)(1),
(2) Date: Nov. 29, 2022

(87) PCT Pub. No.: WO2022/262530
PCT Pub. Date: Dec. 22, 2022

(65) Prior Publication Data
US 2024/0231890 A1 Jul. 11, 2024

(30) Foreign Application Priority Data
Jun. 16, 2021 (CN) .......................... 202110669220.3

(51) Int. Cl.
*G06F 9/48* (2006.01)
*G06F 9/445* (2018.01)
(Continued)

(52) U.S. Cl.
CPC .......... *G06F 9/485* (2013.01); *G06F 9/44594* (2013.01); *G06F 9/5016* (2013.01);
(Continued)

(58) Field of Classification Search
CPC .... G06F 9/485; G06F 9/44594; G06F 9/5016; G06F 9/5022; G06F 11/073;
(Continued)

(56) References Cited

U.S. PATENT DOCUMENTS 9,760,399 B1 * 9/2017 Fraser ..................... G06F 9/485
10,289,555 B1 * 5/2019 Michaud ............... G06F 12/109
(Continued)

FOREIGN PATENT DOCUMENTS

CN 101814049 A 8/2010
CN 104317702 A 1/2015
(Continued)

OTHER PUBLICATIONS

Anonymous, "Kill 64bit Process During Installation/Uninstallation-Community," XP093085705, 3 pages, URL: https://community.flexera.com/t5/InstallShield-Knowledge-Base/Kill-64bit-Process-During-Installation-Uninstallation/ta-p/4294 (Jul. 13, 2018).
(Continued)

*Primary Examiner* — Peng Ke
(74) *Attorney, Agent, or Firm* — Leydig, Voit & Mayer, Ltd.

(57) ABSTRACT

A memory management method and an electronic device are disclosed. The method includes: starting an application and providing virtual memory to the application; checking a space of the virtual memory occupied while the application is running; checking bitness of a process run by the application when the space of the virtual memory occupied is greater than a first threshold; and performing a process-killing operation on the application based on the bitness of the process run by the application. In the foregoing method, a specific application is checked and killed according to a preset policy by combining multi-dimensional information according to occupancy of virtual memory based on a
(Continued)

memory exception occurring in a running application, so as to resolve a memory leak problem.

20 Claims, 10 Drawing Sheets

(51) Int. Cl.
| | |
|---|---|
| *G06F 9/50* | (2006.01) |
| *G06F 11/07* | (2006.01) |
| *G06F 12/02* | (2006.01) |
| *G06F 12/08* | (2016.01) |

(52) U.S. Cl.
CPC .......... *G06F 9/5022* (2013.01); *G06F 11/073* (2013.01); *G06F 11/0754* (2013.01); *G06F 12/0253* (2013.01); *G06F 12/08* (2013.01)

(58) Field of Classification Search
CPC .. G06F 11/0754; G06F 12/0253; G06F 12/08; Y02D 10/00
See application file for complete search history.

(56) References Cited

U.S. PATENT DOCUMENTS

| | | | |
|---|---|---|---|
| 2015/0277867 A1* | 10/2015 | Hasabnis | G06F 9/44521 |
| | | | 717/164 |
| 2016/0321115 A1* | 11/2016 | Thorpe | G06F 11/3409 |
| 2018/0349261 A1* | 12/2018 | Desai | G06F 9/5016 |
| 2019/0220318 A1 | 7/2019 | Yang et al. | |
| 2019/0303206 A1* | 10/2019 | Shutoh | G06F 9/4881 |
| 2020/0151046 A1* | 5/2020 | Chen | G06F 11/0772 |
| 2020/0206621 A1 | 7/2020 | Ju et al. | |
| 2021/0011772 A1* | 1/2021 | Zhou | G06F 9/5027 |

FOREIGN PATENT DOCUMENTS

| | | | |
|---|---|---|---|
| CN | 105005534 A | 10/2015 | |
| CN | 106339250 A | 1/2017 | |
| CN | 109656722 A | 4/2019 | |
| CN | 110221921 A | 9/2019 | |
| CN | 111090536 A | 5/2020 | |
| CN | 111338796 A | 6/2020 | |
| CN | 111381996 A | 7/2020 | |
| CN | 111611020 A | 9/2020 | |
| CN | 111880991 A | 11/2020 | |
| CN | 112487414 A | 3/2021 | |
| CN | 113434288 A | 9/2021 | |
| EP | 3819766 A1 | 5/2021 | |

OTHER PUBLICATIONS

Ahmed Mohamed Hussein, "Effective memory management for mobile environments"; XP055458229, 134 pages, URL: https://docs.lib.purdue.edu/cgi/viewcontent.cgi?article=2164&context-open_access_dissertations (Dec. 2016).

Guo et al., "Linux Principles and Structures," Xi'an University of Electronic Technology Press, Mar. 31, 2012, p. 198-p. 199.

Rsapaper, "Linux Monitors the Resources (Memory) Consumed By the Process, and Kills It after Reaching the Threshold (Absolute Value, Relative Value)," Dec. 11, 2017, Retrieved from the internet, URL: http://www.cnblogs.com/rsapaper/p/8023682.html.

The Road To Android Advancement, "Android Background Kill (3)—Principle of LowMemoryKiller (4.3-6.0)," Jun. 21, 2019, Retrieved from the internet, URL: https://blog.csdn.net/weixin_45136073/article/details/93192132.

* cited by examiner

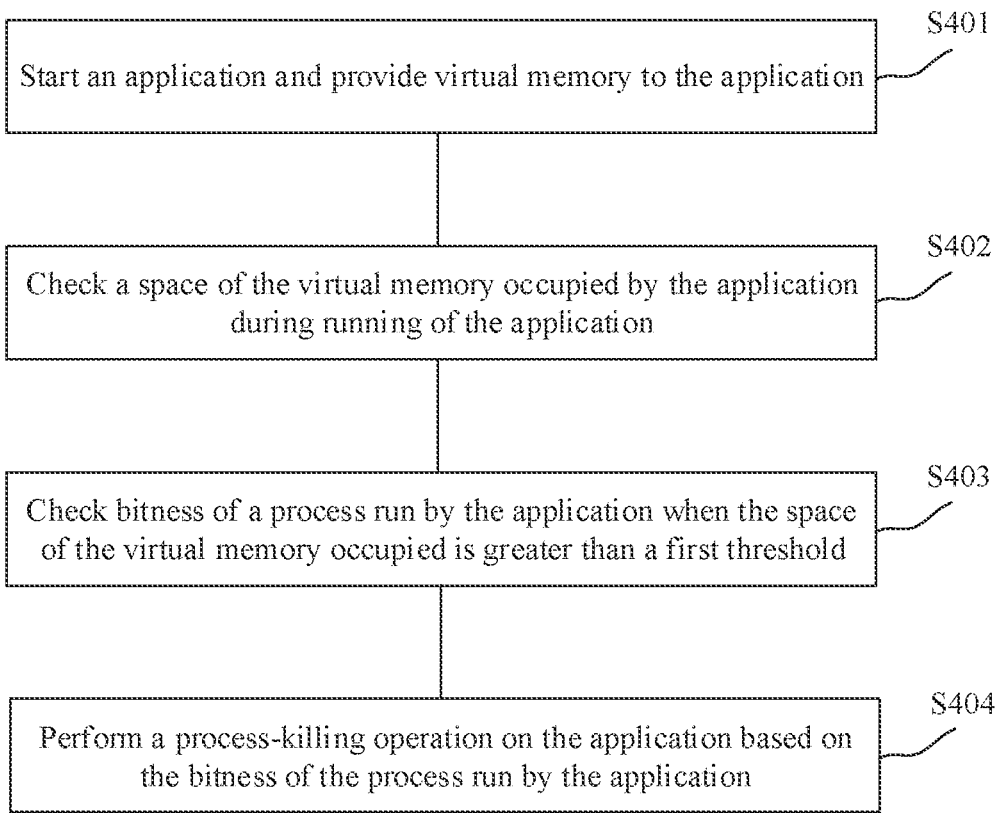

S401

Start an application and provide virtual memory to the application

S402

Check a space of the virtual memory occupied by the application during running of the application

S403

Check bitness of a process run by the application when the space of the virtual memory occupied is greater than a first threshold

S404

Perform a process-killing operation on the application based on the bitness of the process run by the application

FIG. 4

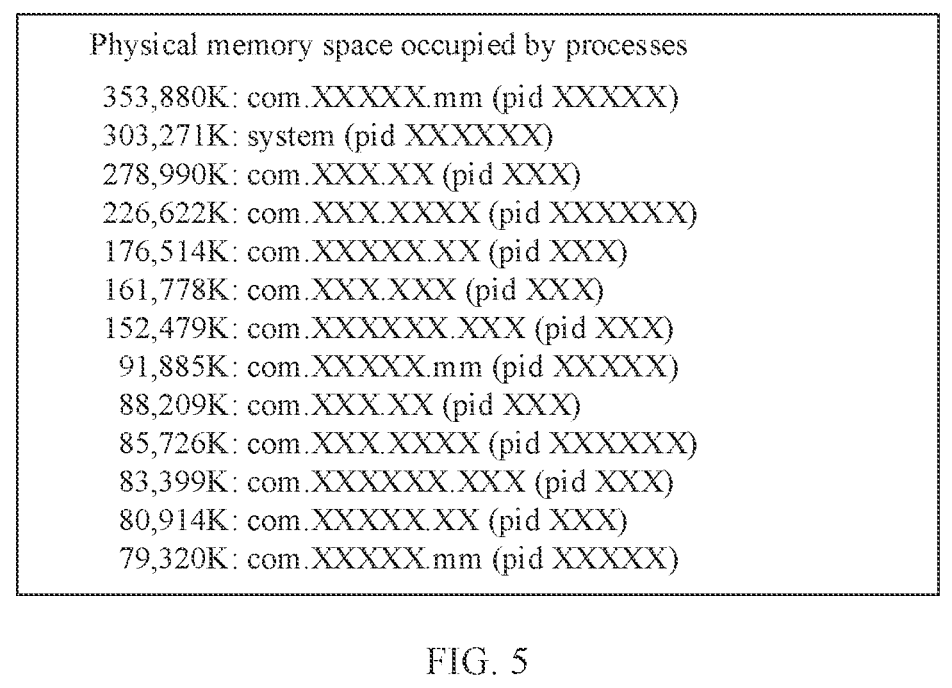

Physical memory space occupied by processes 353,880K: com.XXXXX.mm (pid XXXXX)
303,271K: system (pid XXXXXX)
278,990K: com.XXX.XX (pid XXX)
226,622K: com.XXX.XXXX (pid XXXXXX)
176,514K: com.XXXXX.XX (pid XXX)
161,778K: com.XXX.XXX (pid XXX)
152,479K: com.XXXXXX.XXX (pid XXX)
 91,885K: com.XXXXX.mm (pid XXXXX)
 88,209K: com.XXX.XX (pid XXX)
 85,726K: com.XXX.XXXX (pid XXXXXX)
 83,399K: com.XXXXXX.XXX (pid XXX)
 80,914K: com.XXXXX.XX (pid XXX)
 79,320K: com.XXXXX.mm (pid XXXXX)

FIG. 5

MEMORY MANAGEMENT METHOD AND ELECTRONIC DEVICE

CROSS-REFERENCE TO RELATED APPLICATIONS

This application is a national stage of International Application No. PCT/CN2022/094490, filed on May 23, 2022, which claims priority to Chinese Patent Application No. 202110669220.3, filed on Jun. 16, 2021. The disclosures of both of the aforementioned applications are hereby incorporated by reference in their entireties.

TECHNICAL FIELD

This application relates to the field of memory technologies, and in particular, to a memory management method and an electronic device.

BACKGROUND

Memory leak is a phenomenon occurring when memory that is no longer used is not released due to an error in a running logic of an application (APP) or when memory is not released in a timely manner due to poor processing performance of an application, which results in continuous backlog of occupied memory. At present, the problem of memory leak is still a pain point in the software field. Improper use of resources, objects, pictures, threads, files, display, and the like may all lead to memory leaks.

If a memory leak occurs during running of an application, memory that has been allocated as requested will always be occupied and cannot be released for other use. As memory resources of a system are limited, each time the application dynamically requests memory afterwards, memory resources of the system will become less, ultimately affecting normal operations of services.

Therefore, it has become an important topic of research nowadays how the problem of memory leak is alleviated so as to optimize memory performance of electronic devices and improve user experience.

SUMMARY

This application provides a memory management method and an electronic device, to check and kill a specific application according to a preset policy by combining multi-dimensional information according to occupancy of virtual memory when a memory exception occurs in a running application, so as to resolve the problem of memory leak.

According to a first aspect, a memory management method is provided, applied to an electronic device and including: starting an application and providing virtual memory to the application; checking a space of the virtual memory occupied while the application is running; when the space of the virtual memory occupied is greater than a first threshold, checking bitness of a process run by the application; and performing a process-killing operation on the application based on the bitness of the process run by the application.

Bitness of a target process may be used to indicate what bitness of a process run by the application is, for example, a 32-bit process or a 64-bit process. The performing a process-killing operation on the application hereinafter can also be described as checking and killing the application.

In one implementation, a maximum virtual memory that an application can support is different for applications with different bitness. For example, the maximum virtual memory that a 32-bit application can support is 4 GB (gigabytes). Therefore, the first threshold may be determined according to bitness of a process run by the application. For example, for an application running a 32-bit process, the first threshold may be set to 3.2 GB or 3.5 GB. In other words, there may be a correspondence between the first threshold and the bitness of the process run by the application.

According to the method provided in this implementation, a corresponding threshold of virtual memory space that may be occupied by an application may be set. During running of the application, if it is detected that the space of the virtual memory occupied by the application is greater than the threshold, the bitness of the process may be further estimated. In combination with bitness information of the process, it can be determined whether the application causes a memory leak, and if yes, the application is checked and killed, so as to accurately process the application with memory exception in occupancy and effectively manage memory resources.

With reference to the first aspect, in some implementations of the first aspect, the performing a process-killing operation on the application based on the bitness of the process run by the application specifically includes: performing a process-killing operation on the application when it is determined based on the bitness of the process run by the application that the process run by the application is the target process.

It should be understood that the target process herein may include a process corresponding to the first threshold. For example, if the first threshold is set according to a maximum virtual memory supported by a 32-bit application, the target process may be a 32-bit process. Alternatively, the target process may be a process that has no correspondence with the first threshold but meets other application checking and killing conditions, for example, a process whose virtual memory occupied reaches a preset threshold.

According to the method provided in this implementation, the process-killing operation on the application is performed when it is determined based on the bitness of the process run by the application that the process run by the application is the target process, which can accurately process the application with memory exception in occupancy and effectively manage memory resources, avoiding a problem that direct checking and killing of the application interferes with use of the application by a user, resulting in poor user experience.

With reference to the first aspect, in some implementations of the first aspect, the performing a process-killing operation on the application when it is determined based on the bitness of the process run by the application that the process run by the application is a target process specifically comprises: performing a process-killing operation on the application when it is determined based on the bitness of the process run by the application that the process run by the application is a 32-bit process.

With reference to the first aspect, in some implementations of the first aspect, when the application is in a background running state, the method further includes: checking a duration for which the application has been in the background running state when it is determined based on the bitness of the process run by the application that the process run by the application is a 32-bit process; and performing a process-killing operation on the application when the duration for which the application has been in the background running state is longer than a preset duration.

It should be understood that, in some cases, a short period of time for which the application is switched to the background state might mean that the user temporarily does not use the application. Therefore, to avoid direct checking and killing of an application that the user temporarily switches to the background but continues to use later, in this implementation, the duration for which the application has been in the background running state is further estimated, and the application is only checked and killed when that duration is longer than the preset duration.

According to the method provided in this implementation, when the process run by the application is the target process, the duration for which the application has been in the background running state can be further estimated, and when the duration for which the application has been in the background running state is longer than the preset duration, a process-killing operation is performed on the application. With further reference to the duration for which the application has been in the background state, whether the application is to be checked and killed can be estimated, which can avoid a problem that after a particular application is checked and killed, the use of the application by the user is interfered, thereby degrading user experience.

With reference to the first aspect, in some implementations of the first aspect, the performing a process-killing operation on the application when the duration for which the application has been in the background running state is longer than a preset duration further includes: checking a type of the application when the duration for which the application has been in the background running state is longer than the preset duration; and performing a process-killing operation on the application when the type of the application is a preset type.

It should be understood that the application being a preset type refers to an application that can be checked and killed when a memory leak occurs and the process is a process with target bitness. For example, an application that is of the preset type may include an application that has a great influence on user experience or is important to the user.

In some implementations, the user may autonomously set, based on needs, a particular application as an application that can be checked and killed; or, a system may specify a specific application as a preset type of application by default; or alternatively, whether an application is a preset type of application may be determined by querying the user.

According to the method provided in this implementation, for an application in a background running state, whether the application is to be checked and killed may be estimated based on a process run by the application, a duration for which the application has been in the background running state, and a type of the application. In other words, after it is determined that the application is a process with target bitness (that is, a 32-bit process) and the duration for which the application has been in the background running state is greater than the preset duration, it can be further estimated whether the corresponding type of the application belongs to the preset type, and if yes, which indicates that it is necessary to check and kill the application, a process-killing operation is performed on the application. By checking whether the application running a 32-bit process belongs to the preset type of application and performing the process-killing operation on the application that matches the preset type, it is possible to avoid direct checking and killing of an application that is important to the user and affecting user experience.

With reference to the first aspect, in some implementations of the first aspect, the preset type of application includes at least one of the following: communication-type application, tool-type application, shopping-type application, news-type application, and news-type application.

With reference to the first aspect, in some implementations of the first aspect, when the application is in a foreground running state, the method further includes: checking a remaining system physical memory space; and checking a space of the virtual memory occupied while the application is running when the remaining system physical memory space is less than a second threshold.

It should be understood that, generally, an application in a foreground running state may be an application that the user is using, and direct checking and killing of the application may interfere with a normal use by the user. Therefore, for the application in the foreground running state, the remaining system physical memory space may be further checked. An operation of checking virtual memory occupied by the application is performed only when the remaining space is less the second threshold.

With reference to the first aspect, in some implementations of the first aspect, when it is determined that the process corresponding to the application is a non 32-bit process, the space of the physical memory occupied is checked while the application is running; and the process-killing operation is performed on the application when the space of the physical memory occupied is greater than a third threshold.

According to the method provided in this implementation, the physical memory space occupied by the application whose running process is not a 32-bit process is further estimated, so that whether it is necessary to check and kill the application can be more accurately determined, so as to avoid user experience degradation caused by direct checking and killing of the application.

With reference to the first aspect, in some implementations of the first aspect, the checking a space of the virtual memory occupied while the application is running further includes: checking whether a trigger event occurs during running of the application; and checking the space of the virtual memory occupied while the application is running, when it is determined that the trigger event has occurred.

With reference to the first aspect, in some implementations of the first aspect, the checking the space of the virtual memory occupied while the application is running, when it is determined that the trigger event has occurred specifically includes: checking the space of the virtual memory occupied while the application is running, when it is determined that free system memory space in the electronic device is less than a fourth threshold; or checking the space of the virtual memory occupied while the application is running, when it is determined that a preset cycle is met; or checking the space of the virtual memory occupied while the application is running, when it is determined that a rate at which the application requests the virtual memory is greater than a fifth threshold.

It should be understood that regardless of an application running in the background or an application running in the foreground, the electronic device performs operations of checking virtual memory occupied by these applications, which may be performed under triggering of trigger events, that is, only when a trigger event occurs, the electronic device checks the virtual memory occupied by the running application and performs the subsequent process-killing operation.

According to a second aspect, an electronic device is provided, including: one or more processors; and one or more memories; where the one or more memories store one or more computer programs, the one or more computer programs include instructions, and when the instructions are executed by the one or more processors, the electronic device is enabled to perform the memory management method according to any one of the implementations of the first aspect.

According to a third aspect, a computer-readable storage medium is provided, where the computer-readable storage medium stores a computer program, the computer program includes instructions, and when the instructions are invoked by a computer, the computer is enabled to perform the memory management method according to any one of the implementations of the first aspect.

According to a fourth aspect, a chip system is provided, including: a communications interface, configured to input and/or output information; a memory, configured to store a computer executable program; and a processor, configured to execute the computer executable program to enable a device with the chip system installed to perform the memory management method according to any one of the implementations of the first aspect.

According to a fifth aspect, a computer program product is provided, where the computer program product includes computer program instructions, and when the computer program instructions run on a computer, the computer is enabled to perform the memory management method according to any one of the implementations of the first aspect.

BRIEF DESCRIPTION OF DRAWINGS

FIG. 4 is a schematic flowchart of a memory management method according to an embodiment of this application.

FIG. 5 is a schematic diagram of physical memory occupied by processes of a system according to an embodiment of this application.

DESCRIPTION OF EMBODIMENTS

Figure 1:
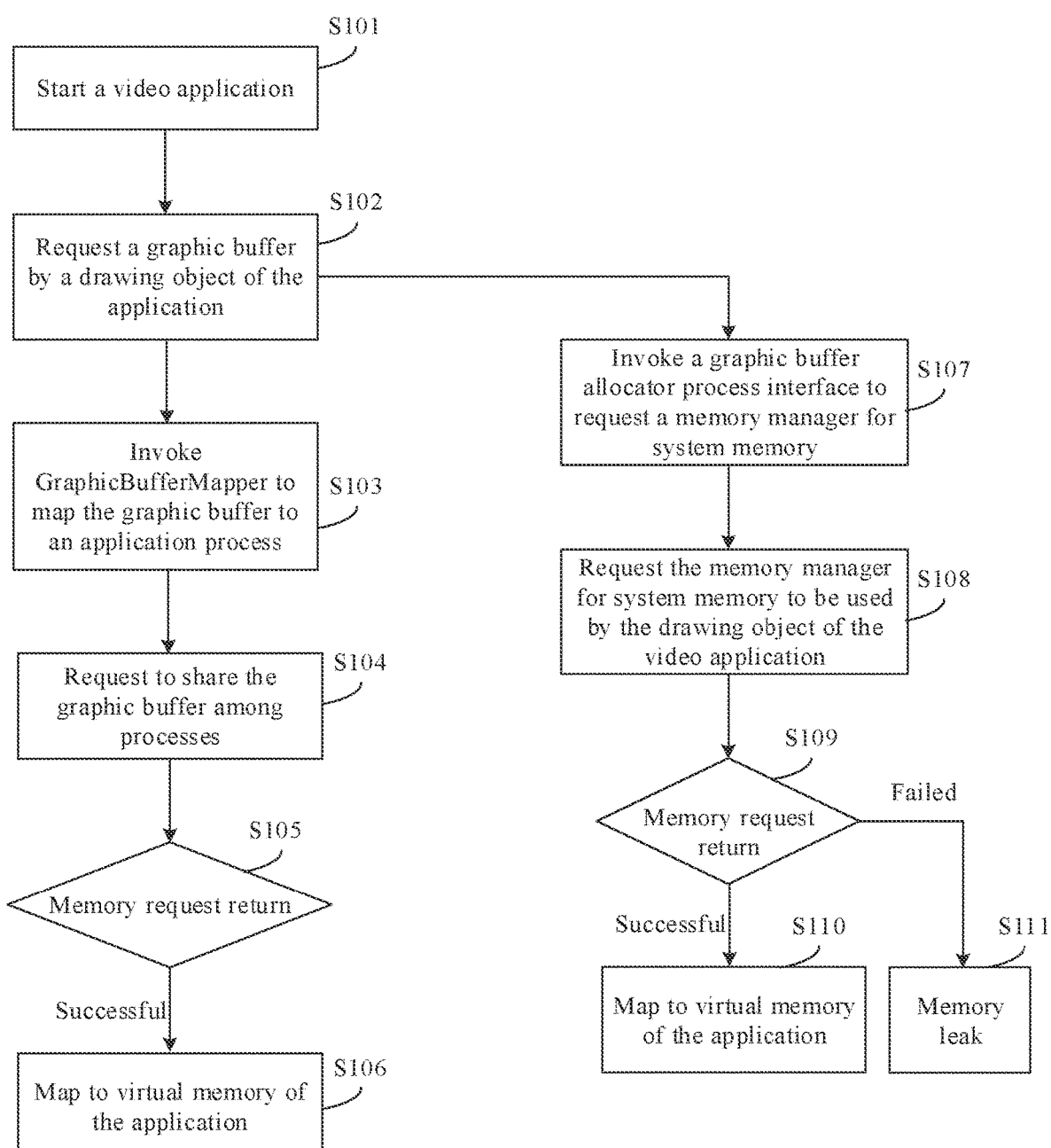
FIG. 1 is a schematic flowchart of a memory leak.

It should be noted that terms used in the embodiments of this application are used to merely explain the embodiments of this application, with no intention to limit this application. In a description of the embodiments of this application, unless otherwise specified, "/" indicates an "or" relationship. For example, A/B may represent A or B. In this specification, "and/or" is merely an association relationship for describing associated objects, and represents that three relationships may exist. For example, A and/or B may represent the following three cases: only A, both A and B, and only B. In addition, in the descriptions of the embodiments of this application, unless otherwise specified, "a plurality of" means two or more than two, and "at least one" and "one or more" mean one, two, or more than two.

Terms "first" and "second" in the following are merely intended for a purpose of description, and shall not be understood as an indication or implication of relative importance or an implicit indication of the number of the indicated technical features. Therefore, a feature limited by "first" or "second" may explicitly or implicitly include one or more features.

Reference to "an embodiment", "some embodiments", or the like described in this specification means that one or more embodiments of this application include a specific feature, structure, or characteristic described with reference to that embodiment. Therefore, expressions such as "in an embodiment", "in some embodiments", "in some other embodiments", and "in some different embodiments" appearing in different places in this specification do not necessarily all refer to a same embodiment, but mean "one or more but not all embodiments", unless otherwise specifically emphasized. The terms "include", "comprise", "have", and variants thereof all mean "include but not limited to", unless otherwise specifically emphasized.

The technical solutions in the embodiments of this application may be applied to various communications systems, for example, a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, and a future 5th generation (5G) system or new radio (NR).

To better understand the memory leak management method provided in the embodiments of this application, definitions of terms involved in the embodiments of this application are described first in the following.

(1) Physical memory: Physical memory is relative to virtual memory and refers to memory space obtained by physical memory modules.

(2) Virtual memory: Virtual memory refers to a memory management technology in the operating system and is an abstraction of memory provided by the operating system, and the virtual memory may not be limited by physical memory space. From the perspective of an application process, the application process has continuous and available virtual memory space, and in fact, this virtual memory space is typically mapped to discontinuous address spaces in physical memory.

(3) System memory: System memory includes physical memory and virtual memory, and a main function of the system memory is to provide temporary storage for an operating system and various applications when an electronic device is running.

(4) Dynamic memory request function: This function may be used to dynamically request memory in the system. Memory to be requested may be specified according to an application parameter value of the function, and the function may return the first address (or memory address) of the memory allocated as requested.

(5) Memory release function: This function may be used to release the memory allocated as requested by the dynamic memory request function.

(6) Low memory killer (LMK): This is a management mechanism by which an Android® kernel layer checks and kills a process and releases memory according to a specified policy in case of low memory. When in low memory, the system may be triggered to check and kill some processes in background with low priorities.

(7) Running state: Running states of an application in an operating system may be classified into a foreground running state and a background running state. In the foreground running state, the application runs directly on a display window or screen of the display and presents a current screen on which the application runs, so that the electronic device can interact with the consumer (that is, the user) through the displayed screen. In the background running state, no running screen of the application is displayed on the display, however, the application continues to provide service in the background. For an application with a visual display screen, the application can switch from the background running state to the foreground running state, or switch from the foreground running state to the background running state at any time.

With reference to the content introduced in the background section, when continuous memory leak leads to small remaining system memory space, a virtual machine frequently triggers garbage collection (GC), which may cause an application to suddenly freeze, respond slowly, display abnormally, even exit, or the like during use of an electronic device such as a mobile phone, seriously affecting user experience. To better understand the memory management method provided in the embodiments of this application, the following describes a principle of generation of memory leak by using a scenario in which a user uses a 32-bit video application to watch a video as an example.

It should be understood that one application may correspond to one process, and one process may include one or more threads. When a video application is started, a system creates a 32-bit process for the application. During running of the process, the system further allocates virtual memory up to 4 GB (that is. 2 to the 32nd power) for the process according to a request from the process. The reason why it is 4 GB is that in a 32-bit operating system, a pointer has a length of 4 bytes, and the addressing capability of a 4-byte pointer is from 0x00000000 to 0xFFFFFFFF, and the maximum value of 0xFFFFFFFF represents a virtual memory space of 4 GB. There is a mapping relationship between the virtual memory address space and physical memory addresses. When the operating system maps virtual addresses to physical addresses, the physical addresses are mapped to this range, and each process can only access data in its own virtual space, but cannot access data outside the virtual memory.

For example, FIG. 1 is a schematic flowchart of a memory leak. An embodiment of FIG. 1 is described by using a memory request procedure when a memory leak occurs to a drawing object of a video application as an example, and the procedure includes the following steps.

S101. Start a video application.

S102. Request a graphic buffer (GraphicBuffer) by a drawing object of the application.

During startup or running of the video application, the process needs to request system memory for drawing tasks (or threads) to store data (such as bitmap data) under such tasks. Therefore, this step is used to create a memory space that can be accessed by the application.

S103. Invoke GraphicBufferMapper to map the graphic buffer to an application process.

After the graphic buffer is allocated as requested in step S102, a preset function GraphicBufferMapper may be invoked to lock the graphic buffer and map the locked graphic buffer to the current video application process.

S104. Request to share the graphic buffer among processes.

A drawing object (that may be used to execute any one of threads in drawing tasks) of the video application may request to use the graphic buffer. The drawing object may be used to execute at least one of the foregoing drawing tasks.

S105. Memory request return.

If virtual memory currently occupied by the drawing task or drawing tasks is small (for example, less than 3.7 GB), a graphic buffer allocator may successfully return the memory that is requested by the drawing object of the video application to the drawing object of the video application, and then step S106 may be performed, that is, the graphic buffer that is allocated as requested may be normally mapped to virtual memory of the application.

If a memory leak occurs in the drawing task, resulting in that the virtual memory occupied by the drawing task is greater than a preset value (for example, 3.7 GB), the graphic buffer allocator cannot return the memory that is requested by the drawing object of the video application to the drawing object of the video application, that is, a failure is returned for the memory request. In this case, the drawing object may perform step S107 to step S110 (or step S111), and continue to request system memory through a GraphicBufferAllocator process interface.

A failure being returned for the memory request in step S105 is used as an example to describe the procedure of continuing to request memory.

S107. Invoke, by the drawing object, the graphic buffer allocator (GraphicBufferAllocator) process interface to request a memory manager for system memory.

S108. Request, by the graphic buffer allocator (GraphicBufferAllocator) process interface, the memory manager for system memory to be used by the drawing object of the video application.

S109. Return, by the memory manager in response to the memory request, the memory that is requested.

If the memory manager successfully returns the memory, the graphic buffer that is allocated as requested may be mapped to the virtual memory of the application; and failure to return the memory by the memory manager indicates that the drawing object may have a memory leak at that time.

With reference to the foregoing procedure, it should be understood that in a normal case, after a thread of the video application ends running, memory occupied by the thread no longer needs to be occupied and is released. However, if for some reason, heap memory allocated to the thread by the system is not released or not released in a timely manner (that is, memory leak occurs), memory occupied by the thread that is no longer used in the current application cycle cannot be reclaimed for other use. In order to ensure a normal operation, the video application may request more memory in subsequent running, resulting in more memory occupied by the video application and fewer memory resources of the system. As more memory resources are accumulated by the video application, a virtual machine frequently triggers the garbage collection mechanism, resulting in problems such as application freeze and slow response time. Then, when the accumulated virtual memory occupied by the video application is close to a maximum virtual memory (4 GB) that the video application supports, because a process interface (graphicbufferallocator) for continuing to request system memory is a 64-bit process, the process can still continue to request the memory manager for memory. However, in fact, the memory allocated by the system to the application can no longer be mapped to virtual memory, and because the memory has already been allocated as requested by the application, the system marks the memory as being in use by the application, and therefore the memory can no longer be allocated to another application. Because the requested system memory is not successfully obtained this time, the application then repeats the foregoing procedure and continues to request system memory. As a result, actual available memory space in the system becomes less, and the system is in a memory leak state. Continuous memory leak may eventually deplete the entire system memory, leading to system freeze.

In summary, the problem of memory leak not only affects the normal operation of the application, but may also cause the system and application to crash. In severe cases, the user needs to force restart of the electronic device or use other ways to restore normal use, which brings poor experience to the user.

For the problem of memory leak, a current method is generally as follows: When the electronic device is performing memory optimization, generally, a process-killing mechanism (or referred to as a checking and killing process) is triggered to reclaim the memory as long as free system memory is lower than a specified threshold. Due to priority restrictions, this mechanism generally selects a background process to check and kill. An Android operating system is used as an example, and a mechanism for checking and killing and reclaiming memory in the Android operating system is a low memory killer (LMK) mechanism. The LMK mechanism mainly uses oom_adj to estimate the importance of a process. A smaller value of oom_adj represents a higher importance of a program and a lower possibility that the program is to be checked and killed. A priority value of oom_adj of an application running in the background is positive, and a priority value of oom_adj of an application running in the foreground is 0). Therefore, when the LMK mechanism is triggered in case of low system memory in the Android system, the background process is preferentially killed, and the foreground process is generally not to be checked and killed.

However, the current memory reclaim method of directly checking and killing a background program does not take user experience in using the application in connection with specific application scenarios into consideration. For example, when watching a video, the user temporarily switches to another application if there are other things to be handled. In this case, if the video application running in the background is directly checked and killed, the user cannot directly switch to a previous video playback page when the user wants to watch the video again, thereby bringing poor user experience. In addition, if the foreground application is a main source of a memory leak, only checking and killing the process of the background application cannot fundamentally resolve the problem of memory leak, and problems such as system freeze and application freeze eventually still occur.

For the foregoing problems in the prior art, an embodiment of this application provides a memory management method. The memory management method estimates an occurrence of a memory leak according to space of virtual memory occupied by an application, combines multi-dimensional information such as a running state of the application, and checks and kills some applications in a targeted manner according to a preset policy, so that applications can be flexibly checked and killed according to use requirements of the user, so as to improve user experience.

The memory management method provided in this embodiment of this application can be applied to various types of electronic devices, for example, a mobile phone, a wearable device (such as a smart watch, a smart wristband, smart glasses, smart jewelry), a tablet computer, an in-vehicle device, an augmented reality (AR)/virtual reality (VR) device, a notebook computer, an ultra-mobile personal computer (UMPC), a netbook, a personal digital assistant (PDA), a smart television, a smart display, and another electronic device with a display screen. The foregoing electronic device may alternatively be another electronic device such as a laptop computer (laptop) having a touch-sensitive surface (for example, a touch panel), and a specific type of the electronic device is not limited in this embodiment of this application.

Figure 2:
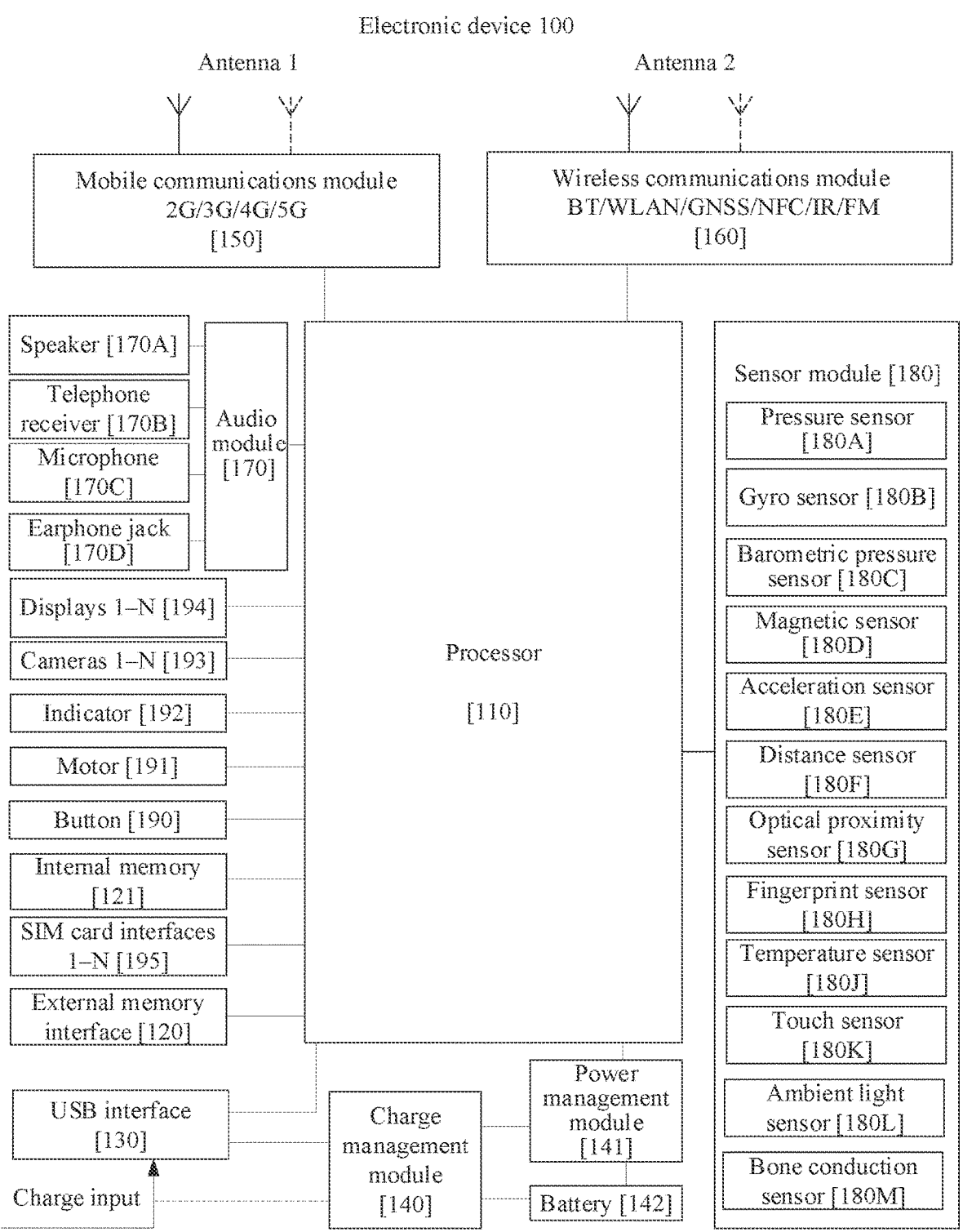
FIG. 2 is a schematic structural diagram of an electronic device according to an embodiment of this application.

For example, FIG. 2 is a schematic structural diagram of an electronic device according to an embodiment of this application.

As shown in FIG. 2, the electronic device 100 may include a processor 110, an external memory interface 120, an internal memory 121, a universal serial bus (USB) interface 130, a charge management module 140, a power management module 141, a battery 142, an antenna 1, an antenna 2, a mobile communications module 150, a wireless communications module 160, an audio module 170, a speaker 170A, a telephone receiver 170B, a microphone 170C, an earphone jack 170D, a sensor module 180, a button 190, a motor 191, an indicator 192, a camera 193, a display 194, a subscriber identification module (SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It can be understood that the structure illustrated in this embodiment of the present disclosure does not constitute a specific limitation on the electronic device 100. In some other embodiments of this application, the electronic device 100 may include more or fewer components than shown in the figure, or combine some components, or split some components, or have different component arrangements. The components shown in the figure may be implemented by using hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, a neural-network processing unit (NPU), and/or the like. Different processing units may be separate devices, or may be integrated into one or more processors.

The controller may be a nerve center and command center of the electronic device 100. The controller may generate an operation control signal according to instruction operation code and a timing signal to complete control of instruction fetching and execution.

A memory may be further provided in the processor 110 to store instructions and data. In some embodiments, the memory in the processor 110 is a cache memory. The memory may store instructions or data just used or repeatedly used by the processor 110. If the processor 110 needs to use the instructions or data again, the processor 110 may directly invoke the instructions or data from the memory.

This avoids repeated access and reduces waiting time of the processor 110, thereby improving system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The I2C interface is a bidirectional synchronous serial bus and includes a serial data line (SDA) and a serial clock line (SCL). In some embodiments, the processor 110 may include a plurality of groups of I2C buses. The processor 110 may be coupled to the touch sensor 180K, a charger, a flash, the camera 193, and the like by using different I2C bus interfaces. For example, the processor 110 may be coupled to the touch sensor 180K through the I2C interface, so that the processor 110 and the touch sensor 180K communicate through the I2C bus interface to implement a touch function of the electronic device 100.

The I2S interface may be used for audio communication. In some embodiments, the processor 110 may include a plurality of groups of I2S buses. The processor 110 may be coupled to the audio module 170 through an I2S bus to implement communication between the processor 110 and the audio module 170. In some embodiments, the audio module 170 may transmit an audio signal to the wireless communications module 160 through the I2S interface, so as to implement a function of answering calls through a Bluetooth earphone.

The PCM interface may also be used for audio communication to sample, quantize, and encode an analog signal. In some embodiments, the audio module 170) and the wireless communications module 160 may be coupled through a PCM bus interface. In some embodiments, the audio module 170 may also transmit an audio signal to the wireless communications module 160 through the PCM interface, so as to implement a function of answering calls through a Bluetooth earphone. Both the I2S interface and the PCM interface may be used for audio communication.

The UART interface is a universal serial data bus used for asynchronous communication. The bus may be a bidirectional communications bus that switches transmission of to-be-transmitted data between serial communication and parallel communication. In some embodiments, the UART interface is generally configured to connect the processor 110 to the wireless communications module 160. For example, the processor 110 communicates with a Bluetooth module of the wireless communications module 160 through the UART interface to implement a Bluetooth function. In some embodiments, the audio module 170) may transmit an audio signal to the wireless communications module 160 through the UART interface, so as to implement a function of playing music through a Bluetooth earphone.

The MIPI interface may be configured to connect the processor 110 to peripheral devices such as the display 194 and the camera 193. The MIPI interface includes a camera serial interface (CSI), a display serial interface (DSI), and the like. In some embodiments, the processor 110 communicates with the camera 193 through the CSI interface, thereby implementing a shooting function of the electronic device 100. The processor 110 communicates with the display 194 through the DSI interface, thereby implementing a display function of the electronic device 100.

The GPIO interface may be configured through software. The GPIO interface may be configured as a control signal or a data signal. In some embodiments, the GPIO interface may be configured to connect the processor 110 to the camera 193, the display 194, the wireless communications module 160, the audio module 170, the sensor module 180, and the like. The GPIO interface may alternatively be configured as an I2C interface, an I2S interface, a UART interface, an MIPI interface, or the like.

The USB interface 130 is an interface that complies with the USB standard specification, and specifically may be a mini USB interface, a micro USB interface, a USB type C interface, or the like. The USB interface 130 may be configured to connect a charger to charge the electronic device 100, and may also be configured to transmit data between the electronic device 100 and a peripheral device. The USB interface 130 may also be configured to connect an earphone to play audio by using the earphone. The interface may also be configured to connect another terminal, for example, an AR device.

It may be understood that the interface connection relationship between the modules illustrated in this embodiment of the present disclosure is merely an example for description, and constitutes no limitation on the structure of the electronic device 100. In some other embodiments of this application, the electronic device 100 may alternatively use an interface connection manner different from those in the foregoing embodiment, or a combination of a plurality of interface connection manners.

The charge management module 140 is configured to receive charge input from a charger. The charger may be a wireless charger or a wired charger. In some embodiments of wired charging, the charge management module 140 may receive charge input from a wired charger through the USB interface 130. In some embodiments of wireless charging, the charge management module 140 may receive wireless charge input through a wireless charging coil of the electronic device 100. When charging the battery 142, the charge management module 140 may also supply power to the terminal through the power management module 141.

The power management module 141 is configured to connect the battery 142, the charge management module 140, and the processor 110. The power management module 141 receives input from the battery 142 and/or the charge management module 140 to supply power to the processor 110, the internal memory 121, an external memory, the display 194, the camera 193, the wireless communications module 160, and the like. The power management module 141 may be further configured to monitor parameters such as battery space, a quantity of battery cycles, and a battery health status (electric leakage and impedance). In some other embodiments, the power management module 141 may alternatively be disposed in the processor 110. In some other embodiments, the power management module 141 and the charge management module 140 may alternatively be disposed in a same device.

A wireless communication function of the electronic device 100 may be implemented by using the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna of the electronic device 100 may be configured to cover one or more communication bands. Different antennas may further support multiplexing so as to increase antenna utilization. For example, the antenna 1 may be reused as a diversity antenna of a wireless local area network. In some other embodiments, the antenna may be used in combination with a tuning switch.

The mobile communications module 150 may provide wireless communication solutions including 2G, 3G, 4G, 5G, and the like, which are applied to the electronic device 100. The mobile communications module 150 may include at least one filter, a switch, a power amplifier, a low noise amplifier (LNA), and the like. The mobile communications module 150 may receive an electromagnetic wave by using the antenna 1, perform processing such as filtering and amplification on the received electromagnetic wave, and transmit the processed electromagnetic wave to the modem processor for demodulation. The mobile communications module 150 may further amplify a signal modulated by the modem processor, and convert the signal into an electromagnetic wave and radiate the electromagnetic wave by using the antenna. In some embodiments, at least some functional modules of the mobile communications module 150 may be provided in the processor 110. In some embodiments, at least some functional modules of the mobile communications module 150 may be provided in a same device with at least some modules of the processor 110.

The modem processor may include a modulator and demodulator. The modulator is configured to modulate a low frequency baseband signal that is to be sent into a medium or high frequency signal. The demodulator is configured to demodulate a received electromagnetic wave signal into a low frequency baseband signal. Then, the demodulator transmits the low frequency baseband signal obtained through demodulation to the baseband processor for processing. After being processed by the baseband processor, the low frequency baseband signal is transferred to the application processor. The application processor outputs a sound signal by using an audio device (not limited to the speaker 170A, the telephone receiver 170B, and the like), or displays an image or a video by using the display 194. In some embodiments, the modem processor may be a separate device. In some other embodiments, the modem processor may be separate from the processor 110 and provided in a same device together with the mobile communications module 150 or another functional module.

The wireless communications module 160 may provide wireless communication solutions applied to the electronic device 100, including wireless local area network (WLAN) (for example, wireless fidelity (Wi-Fi) network), Bluetooth® (BT), global navigation satellite system (GNSS), frequency modulation (FM), near field communication (NFC), infrared (IR), and the like. The wireless communications module 160 may be one or more devices integrating at least one communication processing module. The wireless communications module 160) receives an electromagnetic wave by using the antenna 2, performs frequency modulation and filtering processing on the electromagnetic wave signal, and transmits the processed signal to the processor 110. The wireless communications module 160 may also receive a to-be-transmitted signal from the processor 110, perform frequency modulation and amplification on the signal, and converts the signal into an electromagnetic wave and radiate the electromagnetic wave by using the antenna 2.

In some embodiments, in the electronic device 100, the antenna 1 is coupled to the mobile communications module 150, and the antenna 2 is coupled to the wireless communications module 160, so that the electronic device 100 can communicate with a network and other devices by using a wireless communications technology. The wireless communications technology may include global system for mobile communications (GSM), general packet radio service (GPRS), code division multiple access (CDMA), wideband code division multiple access (WCDMA), time-division code division multiple access (TD-SCDMA), long term evolution (LTE), BT, GNSS, WLAN, NFC, FM, IR, and/or the like.

The electronic device 100 implements a display function by using the GPU, the display 194, the application processor, and the like. The display 194 is configured to display an image, a video, and the like.

The electronic device 100 may implement a shooting function by using the ISP, the camera 193, the video codec, the GPU, the display 194, the application processor, and the like.

The digital signal processor is configured to process digital signals, including not only digital image signals but also other digital signals. For example, when the electronic device 100 selects a frequency, the digital signal processor is configured to perform Fourier transform and the like on frequency energy. The video codec is configured to compress or decompress a digital video. The NPU is a neural-network (NN) computing processor that quickly processes input information by learning from a biological neural network structure, for example, by learning from a mode of transfer between human-brain neurons, and may further perform self-learning constantly.

The external memory interface 120 may be configured to connect an external storage card, for example, a micro SD card, to extend a storage capacity of the electronic device 100. The external memory card communicates with the processor 110 through the external memory interface 120 to implement a data storage function. For example, files such as music and video files are stored in the external storage card. The internal memory 121 may be configured to store computer executable program code, where the executable program code includes instructions.

The electronic device 100 may use the audio module 170, the speaker 170A, the telephone receiver 170B, the microphone 170C, the earphone jack 170D, the application processor, and the like to implement an audio function, for example, music playing and sound recording.

The pressure sensor 180A is configured to sense a pressure signal, and can convert the pressure signal into an electrical signal. The gyro sensor 180B may be configured to determine a motion posture of the electronic device 100. The magnetic sensor 180D includes a Hall sensor. The electronic device 100 may detect opening and closing of a clamshell or a smart cover by using the magnetic sensor 180D. The acceleration sensor 180E may detect magnitudes of accelerations of the electronic device 100 in all directions (generally along three axes), may detect a magnitude and direction of gravity when the electronic device 100 is static, and may be further configured to recognize a posture of the terminal, and be applied to applications such as screen switching between a landscape mode and a portrait mode, and a pedometer. The optical proximity sensor 180G may include, for example, a light emitting diode (LED) and an optical detector, for example, a photodiode. The light-emitting diode may be an infrared light-emitting diode. The electronic device 100 emits infrared light outward by using the light-emitting diode. The ambient light sensor 180L is configured to sense brightness of ambient light. The electronic device 100 may adaptively adjust brightness of the display 194 based on the sensed brightness of the ambient light. The fingerprint sensor 180H is configured to collect fingerprints. The temperature sensor 180J is configured to detect a temperature. The touch sensor 180K is also referred to as a "touch panel". The touch sensor 180K may be disposed on the display 194, and the touch sensor 180K and the display 194 form a touchscreen, also referred to as a "touch screen". The touch sensor 180K is configured to detect a touch operation performed on or near the touch sensor 180K. The bone conduction sensor 180M may obtain a vibration signal.

In addition, the electronic device 100 further includes the barometric pressure sensor 180C and the distance sensor 180F. The barometric pressure sensor 180C is configured to measure atmospheric pressure. In some embodiments, the electronic device 100 calculates an altitude based on an atmospheric pressure value measured by the barometric pressure sensor 180C to assist positioning and navigation.

The distance sensor 180F is configured to measure a distance. The electronic device 100 may measure a distance by using infrared or a laser. In some embodiments, in a shooting scenario, the electronic device 100 may use the distance sensor 180F to measure a distance for rapid focusing.

Figure 3:
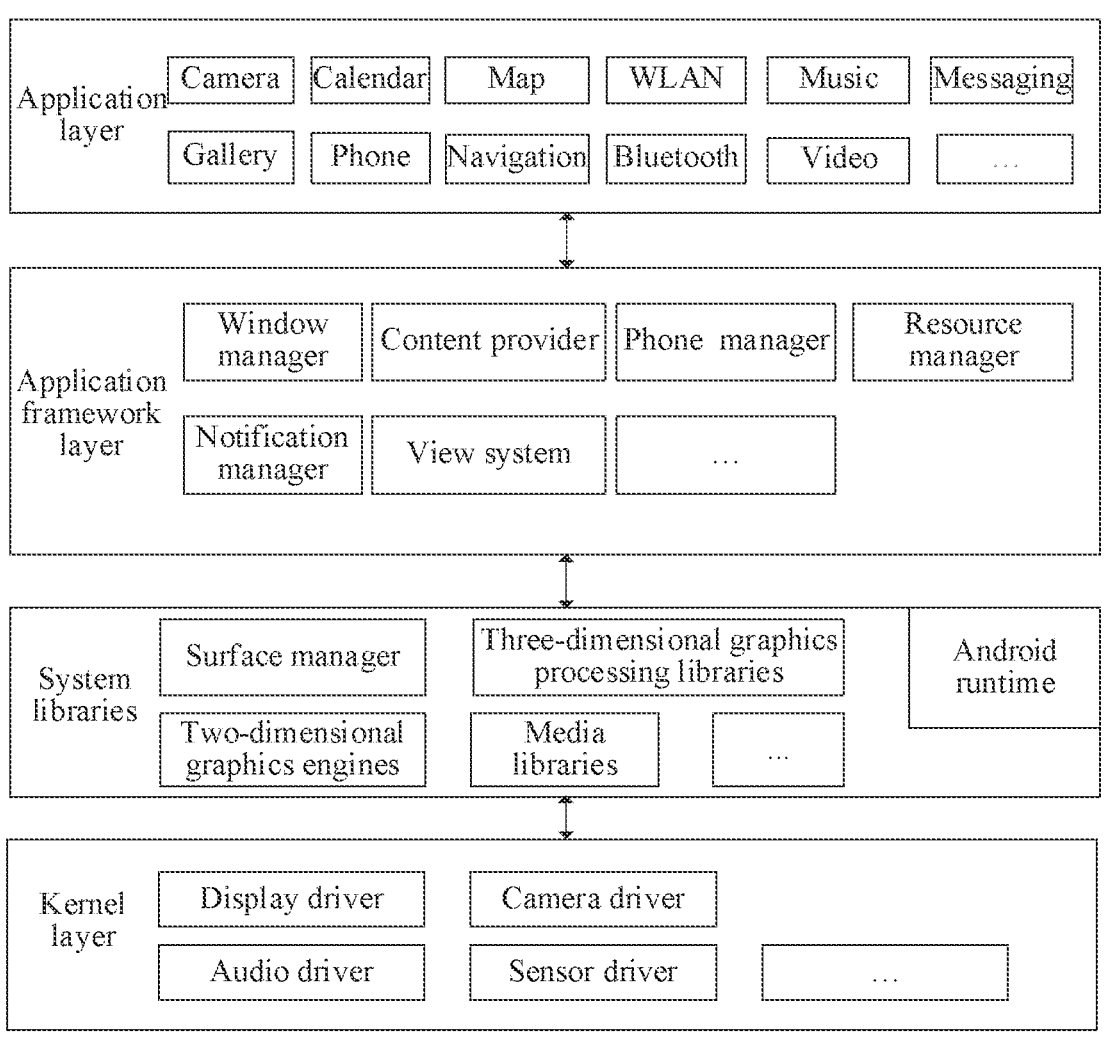
FIG. 3 is a schematic diagram of a software structure of an electronic device according to an embodiment of this application.

For example, FIG. 3 is a schematic diagram of a software structure of an electronic device 100 according to an embodiment of this application.

In a layered architecture, software is divided into several layers, and each layer has clear roles and responsibilities. The layers communicate with each other through software interfaces. In some embodiments, an Android® system is divided into four layers: an application layer, an application framework layer, Android® runtime and system libraries, and a kernel layer from top to bottom.

The application layer may include a series of application packages.

As shown in FIG. 3, the application packages may include applications such as camera, gallery, calendar, phone, map, navigation, WLAN, Bluetooth, music, video, and messaging.

The application framework layer provides an application programming interface (API) and a programming framework for applications at the application layer. The application framework layer includes some predefined functions, for example, dynamic memory request function and memory release function.

As shown in FIG. 3, the Android application framework is divided into an application layer, an application framework layer, a system runtime layer and a Linux kernel layer. The application framework layer includes a window manager, a content provider, a view system, a phone manager, a resource manager, and a notification manager.

The window manager is configured to manage window programs. The window manager may obtain a display screen size, determine whether there is a status bar, lock a screen, capture a screen, and the like.

The content provider is configured to store and obtain data, and make the data accessible to an application. The data may include a video, an image, an audio, calls made and answered, a browsing history, a bookmark, a phone book, and the like.

The view system includes visual controls, for example controls with text displayed and controls with a picture displayed. The view system may be used to build an application. A display screen may include one or more views. For example, a display interface including a messaging notification icon may include a view displaying text and a view displaying a picture.

The phone manager is used to provide a communication function of the electronic device 100, for example, management of a call status (including answering or disconnected).

The resource manager provides various resources for applications, for example, localized character strings, icons, pictures, layout files, and video files.

The notification manager enables an application to display notification information in a status bar, and may be used to convey a message of a notification type that may disappear automatically after a short stay without user interaction. For example, the notification manager is configured to notify that download is completed and alert about a message. Alternatively, the notification manager may be a notification that appears in a status bar at the top of a system in a form of a chart or scroll bar text, for example, a notification of an application running in the background, or may be a notification that appears on a screen in a form of a dialog window. For example, text information is provided in a status bar, a prompt tone sounds, a terminal vibrates, and an indicator blinks.

The Android runtime includes a core library and a virtual machine. The Android runtime is responsible for scheduling and managing an Android system.

The core libraries include two parts: One is a performance function that needs to be invoked by a Java language, and the other is an Android core library.

The application layer and the application framework layer run on the virtual machine. The virtual machine executes java files of the application layer and the application framework layer as binary files. The virtual machine is configured to perform functions such as object lifecycle management, stack management, thread management, security and exception management, and garbage collection.

The system libraries may include a plurality of functional modules, for example, a surface manager, a media library, a three-dimensional graphics processing library (for example, OpenGL ES), and a 2D graphics engine (for example, SGL).

The surface manager is used to manage a display subsystem and provide fusion of 2D and 3D graphic layers for a plurality of applications.

The media library supports play back and recording of audio and videos in a plurality of commonly used formats as well as static image files. The media library may support a plurality of audio and video encoding formats, for example, MPEG4, H.264, MP3, AAC, AMR, JPG, and PNG.

The three-dimensional graphics processing library is configured to implement three-dimensional graphics drawing, image rendering and compositing, graphic layer processing, and the like.

The 2D graphics engine is a drawing engine for 2D drawing.

For example, in this embodiment of this application, a 2D graphics engine may be configured to draw a geofence of a vehicle.

The Linux kernel layer is a layer between hardware and software. The kernel layer includes at least a display driver, a camera driver, an audio driver, and sensor drivers. In this embodiment of this application, a memory exception analysis module, a memory management module, a memory allocation module, and the like may be provided at the Linux kernel layer.

For example, FIG. 4 is a schematic flowchart of a memory management method according to an embodiment of this application. The method may be performed by the electronic device shown in FIG. 2 and FIG. 3, and the process flow may include the following steps.

S401. Start an application and provide virtual memory to the application.

The application may include an application provided by the Android operating system or a third-party application. This is not limited in this embodiment of this application. For example, a procedure of the electronic device starting an application may include, for example: receiving, by the electronic device, an operation of clicking on an application icon by a user, and starting an application in response to the click operation; or receiving, by the electronic device, an operation input by the user through a voice assistant to instruct opening of an application, and starting a corresponding application in response to the voice instruction. A specific scenario of the electronic device starting an application is not limited in this embodiment of this application.

In some embodiments, during process startup, the application may request the operating system for virtual memory; and in response to the request operation by the application, the operating system may provide virtual memory to the application. Specifically, the procedure may include: requesting the operating system for virtual memory by the application through a memory allocator in the electronic device invoking a dynamic memory request function; and in response to the request of the application, providing, by the operating system, a corresponding virtual memory space to the application through the memory allocator of the electronic device.

It should be understood that the virtual memory available to the application of a 32-bit process does not exceed 4 GB, and therefore, the virtual memory requested by the application should not exceed 4 GB under normal conditions (that is, no memory leak occurs).

S402. Check a space of the virtual memory occupied while the application is running.

In some embodiments, the electronic device may perform an operation of checking a virtual memory space occupied by an application (hereinafter referred to as virtual memory check) when a preset condition is met. For example, the preset condition may include a first preset condition and a second preset condition. The first preset condition may be a basic condition or a simple condition that triggers the electronic device to check virtual memory, for example, the first preset condition may include that: (1) System memory is in a low memory state; (2) a preset check cycle is reached; and the like. The second preset condition may be an advanced condition or a complex condition that triggers the electronic device to check virtual memory, for example, the second preset condition may include that: (1) A remaining physical memory space of the electronic device is less than a second threshold, and the second threshold, for example, is 200 MB (megabytes) or 300 MB; (2) the remaining physical memory space in the electronic device reaches a preset level; and (3) a rate at which the application requests virtual memory is greater than a third threshold.

Considering that in practical applications, applications in different running states may not be of the same importance to the user, therefore, the first preset condition and/or the second preset condition may be set as a trigger condition for virtual memory check respectively for the applications in different running states. For example, an application in a background running state (hereinafter referred to as a background application) may be an application that the user has already used or does not need to use at the moment, and is of low importance to the user, and therefore, the first preset condition may be used as a preset condition that triggers the electronic device to perform virtual memory check on applications running in the background. Specifically, that is, the electronic device may be triggered to perform virtual memory check when the system memory is in a low memory state; or the electronic device may be triggered to perform virtual memory check when a preset check cycle is reached, that is, the electronic device checks the virtual memory space occupied by the application at regular intervals.

For another example, an application in a foreground running state (hereinafter referred to as a foreground application) may be an application that the user is using, and is of high importance to the user's use, and therefore, the first preset condition and the second preset condition can be used together as a preset condition for checking the virtual memory occupied by the application running in the foreground, that is, the electronic device may sequentially check whether the first preset condition and the second preset condition are met, and if both conditions are met, the electronic device may be triggered to perform virtual memory check on the foreground application. For example, using the second preset conditions listed above as examples, the procedure of triggering virtual memory check on a foreground application may include the following scenarios.

Scenario 1: When any first preset condition is met, the electronic device may further check the remaining physical memory space, and when the remaining physical memory space is less than the second threshold, the electronic device may be triggered to perform virtual memory check on the foreground application. The second threshold, for example, may be set to 200 MB or 300 MB. This is not limited in this application. The procedure of the electronic device checking whether the remaining amount of physical memory is less than a preset threshold may include: invoking, by the electronic device, an activitymanager.getmemory Info interface via a memory exception analysis module to obtain the current remaining physical memory of the system, and then comparing to determine whether the remaining amount of physical memory is less than a preset threshold.

Scenario 2: When any first preset condition is met, the electronic device may further check the remaining physical memory space, and when the remaining physical memory space in the electronic device reaches a preset level, the electronic device may be triggered to perform virtual memory check on the foreground application.

The preset level herein may be a process-killing level preset according to remaining system memory (such as physical memory) of the electronic device. For example, a correspondence between the remaining physical memory space and a corresponding process-killing level is shown in Table 1.

TABLE 1

| Remaining physical memory space | Process-killing level |
| --- | --- |
| less than or equal to 100 MB | level 1 |
| greater than 100 MB and less than or equal to 150 MB | level 2 |
| greater than 150 MB and less than or equal to 200 MB | level 3 |

It should be understood that different process-killing levels in the Table 1 may correspond to different checking and killing conditions, and the following scenarios may be specifically included.

1. When the process-killing level is level 1 (the remaining physical memory is less than or equal to 100 MB), a corresponding process-killing procedure may be as follows: After determining that the virtual memory space occupied by the application is greater than the first threshold, the electronic device checks bitness of the process run by the application, and directly performs a process-killing operation on the application if the bitness of the running process is target bitness to release system memory occupied by the application.

2. When the process-killing level is level 2 (the remaining physical memory is greater than 100 MB and less than or equal to 150 MB), a corresponding process-killing procedure may be as follows: After determining that the virtual memory space occupied by the application is greater than the first threshold and that the bitness of the running process is the target bitness, the electronic device further checks whether a type of the application matches a check-and-kill type, and if yes, performs a process-killing operation on the application to release the system memory occupied by the application.

3. When the process-killing level is level 3 (the remaining physical memory is greater than 150 MB and less than or equal to 200 MB), a corresponding process-killing procedure may be as follows: After determining that the virtual memory space occupied by the application is greater than the first threshold, that the bitness of the running process is the target bitness, and that the type of the application matches the check-and-kill type, the electronic device further estimates whether the physical memory occupied by the application is greater than a preset threshold, and if yes, performs a process-killing operation on the application to release the system memory occupied by the application.

It should be understood that under this scenario 2, if the remaining physical memory of the electronic device matches a process-killing level, the electronic device may be triggered to perform a virtual memory check operation on the foreground application. If there is a memory exception, later the electronic device may check and kill an application according to the check and kill conditions corresponding to the process-killing level. Less remaining physical memory space may correspond to simpler check-and-kill procedure, so that application checking and killing can be performed efficiently and memory can be optimized.

It should also be understood that the foregoing process-killing procedures for different process-killing levels are only examples. In practical applications, different process-killing procedures may be set under different process-killing levels or different check items may be set before killing of a process. This is not limited in this embodiment of this application.

Scenario three. When any first preset condition is met, the electronic device may further check a rate at which the application requests virtual memory, and when the rate at which the application requests virtual memory is greater than the third threshold, the electronic device may be triggered to perform virtual memory check on the foreground application.

A procedure of the electronic device checking a rate at which the application requests virtual memory may include: setting, by the electronic device through a timer, a polling time for checking the virtual memory occupied by an application process pid (for example, polling once every 2 minutes); then, periodically querying a size of the virtual memory occupied by the process pid from a VmSize (virtual memory) field of a/proc/pid/status file according to the polling time, and returning the sizes Vm1 and Vm2 of the virtual memory occupied respectively at two time points t1 and t2 through a process interface intgetProcessVssMemory Info; and then, according to an equation (1-1), calculating, by a memory exception analysis module according to the time points and their corresponding sizes of virtual memory occupied, an average rate v at which the process pid requests virtual memory in the time period from t1 to t2:

$$v = \frac{V_m2 - V_m1}{t2 - t1} \tag{1-1}$$

It should be understood that the second preset condition listed above for the foreground application is only an example. In practical applications, other conditions may also be used as conditions for triggering the electronic device to perform memory check on the foreground application. For example, in another implementation, when any first preset condition is met, the electronic device may also check a rate at which the application requests physical memory, and when the rate at which the application requests physical memory is greater than a preset threshold, the electronic device may be triggered to perform virtual memory check on the foreground application. Similar to the description for the foregoing scenario three, in this implementation, a procedure of the electronic device obtaining a rate at which the application requests physical memory may include: setting, by the electronic device through a timer, a polling time for checking the physical memory occupied by an application process pid (for example, polling once every 2 minutes); then, periodically querying a size of the physical memory occupied by the process pid from a VmPSS (physical memory) field of a /proc/pid/status file according to the polling time (physical memory occupied by processes of the system is shown in FIG. 5), and returning the sizes Vm3 and Vm4 of the physical memory occupied respectively at two time points t3 and 14 through a process interface intgetProcessRssMemory Info; and then, according to an equation (1-2), calculating, by a memory exception analysis module according to the time points and their corresponding sizes of virtual memory occupied, an average rate at which the process pid requests physical memory in the time period from t1 to t2:

$$v = \frac{V_m4 - V_m3}{t4 - t3} \tag{1-2}$$

In some embodiments, a procedure of the electronic device checking the virtual memory space occupied by the application may include: when the preset condition is met, querying, by the electronic device via the memory exception analysis module, a size of the virtual memory occupied by the process pid run by the application from a VmSize (virtual memory) field of a /proc/pid/status file.

S403. Check bitness of a process run by the application when the space of the virtual memory occupied is greater than a first threshold.

In some embodiments, there is a correspondence between the first threshold and the bitness of the process run by the application, and the first threshold is set according to a maximum virtual memory supported by the process with target bitness. For example, for a 32-bit process, because the maximum virtual memory that the process can support is 4 GB, the first threshold may be set to a value close to 4 GB, for example, 3.2 GB or 3.5 GB.

It should be understood that a space of the virtual memory occupied being greater than the first threshold means that a memory leak may occur in the application, but alternatively may include a situation in which a process with another bitness occupies the memory normally. For example, when virtual memory occupied by an application is greater than 3.5 GB, if the bitness of the application is 64, the memory occupancy by the application is normal and there may be no memory leak. Therefore, in order to accurately estimate whether a memory leak occurs in the application, the electronic device may further check whether the process run by the application is a process with target bitness, that is, estimate whether the process run by the application corresponds to the preset threshold, and if yes, meaning that the virtual content occupied by the application has reached a corresponding virtual memory occupancy limit (that is, the preset threshold), the electronic device can determine that a memory leak actually occurs in the application.

For example, using 32 bit and 64 bit as examples, a procedure of the electronic device checking bitness of an application process may include the following manners. Manner 1: The system forks a child process by zygote to provide a virtual machine and runtime environment in which the application runs, there are two zygote processes in the system at the same time, namely zygote corresponding to a 32-bit process and zygote64 corresponding to a 64-bit process, and a process type returned may be obtained by inputting a pid through an intcheck Process Type (intpid) interface, for example, 10 for 32-bit or 1 for 64-bit, so as to learn that a current application is a 32-bit or 64-bit process. Manner 2: The runtime checks whether the application is a 32-bit process or a 64-bit process through a memory mapping list (maps) of a native process, where the application is estimated to be a 32-bit process if a native program of the application is mapped into system/lib. Manner 3: The application is determined to be a 32-bit process or 64-bit process by estimating a path to the lib library of the application, where the application is determined to be a 32-bit process when a path to the lib library of the application is a path, such as lib/arm, corresponding to a 32-bit process.

S404. Perform a process-killing operation on the application based on the bitness of the process run by the application.

The performing a process-killing on the application refers to: clearing a process of the application in the system memory, and forcing the process to quit running to release the system memory, where the released system memory may be reallocated by the operating system. Optionally, after the system memory occupied by the application is released, the application may alternatively be restarted. This is not limited in this application.

In some embodiments, the process-killing operation may be performed on the application when it is determined based on the bitness of the process run by the application that the process run by the application is a target process. For example, the target process may be a 32-bit process.

In some embodiments, a specific procedure of the electronic device performing a process-killing operation on the application may include: invoking android.os.process.kill-Process (android.os.Process.myPid) or forcestoppackage process interface to clear memory occupied by processes of the application in the system memory, and the system memory cleared may be reallocated by a memory allocation module of the electronic device.

Optionally, after the process-killing operation is performed on the application, the application may alternatively be restarted so that the application runs in a normal state without memory leak.

The memory management method provided in this embodiment of this application checks and kills a specific application by combining multi-dimensional information such as an application scenario of the application according to an abnormal memory occupancy situation in a running application, so that under the premise of meeting different needs of users for use of applications, the system memory is optimized and user experience is improved.

To better understand the memory management method provided in this embodiment of this application, with reference to an accompanying drawing, the following describes a procedure of performing memory management on a background application and a procedure of performing memory management on a foreground application, respectively.

Figure 6:
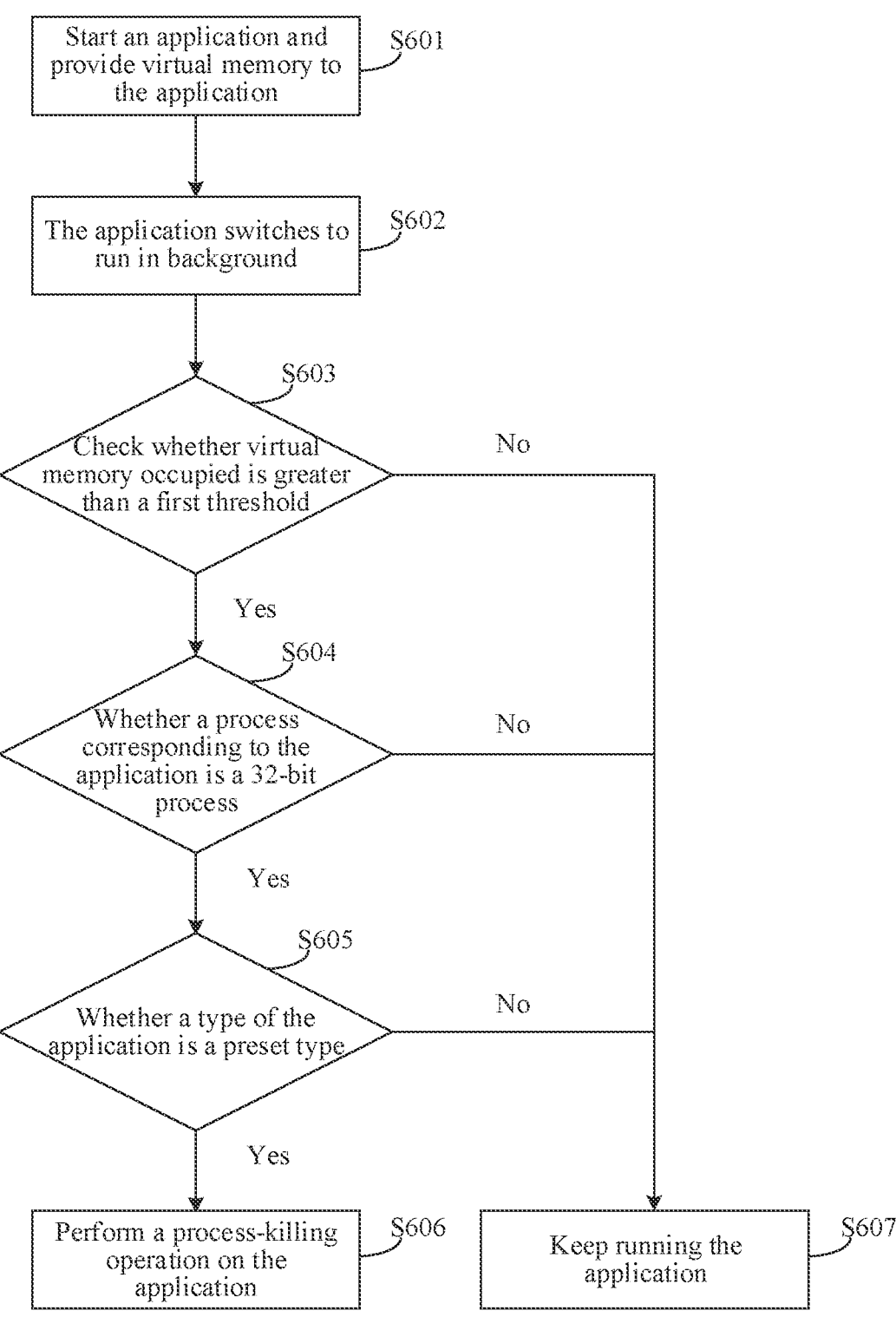
FIG. 6 is a schematic flowchart of another memory management method according to an embodiment of this application.

For example, FIG. 6 is a schematic flowchart of performing memory management on an application in a background running state according to an embodiment of this application. This process flow may be performed by the electronic device and include the following steps.

S601. Start an application and provide virtual memory to the application.

This step may correspond to step S401. For related description, reference may be made to the foregoing content. Details are not repeated herein.

S602. The application switches to run in background.

In some embodiments, an application (such as a video application) may be in a foreground running state during startup or within a short time after startup, and may switch from the foreground running state to a background running state after running for a period of time. For example, the user needs to use another application or function of the electronic device and switches the application to the background running state.

S603. Check whether a space of the virtual memory occupied is greater than a first threshold.

In some embodiments, the electronic device may perform virtual memory space check on the application when a preset condition is met. The preset condition corresponding to the background application may correspond to the first preset condition described above, and for example, may include that: (1) system memory is in a low memory state; (2) a preset check cycle is reached; and the like.

In some embodiments, the electronic device may be triggered to perform virtual memory check when the system memory is in a low memory state; or, the electronic device may be triggered to perform virtual memory check when a preset check cycle is reached, that is, the electronic device checks the virtual memory space occupied by the application at regular intervals.

In some embodiments, a procedure of the electronic device checking the virtual memory space occupied by the application may include: when the preset condition is met, querying, by the electronic device via the memory exception analysis module, a size of the virtual memory occupied by the process pid run by the application from a VmSize (virtual memory) field of a/proc/pid/status file.

In some embodiments, after the space of the virtual memory currently occupied by the background application is obtained, it is estimated whether the space of the virtual memory is greater than the first threshold (such as 3.2 GB or 3.5 GB), and if yes, step S604 is performed, or otherwise, step S607 is performed, that is, the application is kept running.

S604. Check whether a process corresponding to the application is a 32-bit process.

In some embodiments, when it is detected in step S603 that the virtual memory occupied by the application is greater than the first threshold, the electronic device may further estimate whether the application is a 32-bit process; and if yes, the electronic device performs step S605; otherwise, performs step S607, that is, keeps running the application.

In some embodiments, a procedure of the memory exception analysis module estimating whether an application is a 32-bit process may include the following manners. (1) The system forks a child process by zygote to provide a virtual machine and runtime environment in which the application runs, there are two zygote processes in the system at the same time, namely zygote corresponding to a 32-bit process and zygote64 corresponding to a 64-bit process, and the electronic device may obtain a process type returned by inputting a pid through an intcheckProcessType (intpid) interface, for example, 10 for 32-bit or 1 for 64-bit, so as to learn whether a current application is a 32-bit process. (2) The runtime checks that the application is a 32-bit process through a memory mapping list (maps) of a native process, where the application is estimated to be a 32-bit process if a native program of the application is mapped into system/lib. (3) The application is determined to be a 32-bit process by estimating a path to the lib library of the application, where the application is determined to be a 32-bit process when the path to the lib library of the application is a path, such as lib/arm, corresponding to 32-bit processes.

S605. Estimate whether a type of the application is a preset type.

It should be understood that in a scenario in which the application is in a background running state, because the type of the application is different, for the application in some scenarios, checking and killing the application has little influence on user experience, so that a process-killing may be directly performed on the application. While in some other scenarios, the process-killing operation performed on some applications running in the background may affect user experience, for example, applications that would have unfavorable effects on the user's life, work, entertainment, and the like, so that the application may be kept running even if the virtual memory occupied by the application is greater than the first threshold.

In some embodiments, the preset type of application may refer to a background application that does not affect user experience after the process-killing operation is performed on the background application, and for example, may include: instant communication-type application, tool-type application, shopping-type application, news-type application, and news-type application. Applications that do not belong to the preset type, for example, may include: game-type application in running, video-type application or music-type application that switches to run in the background during playing, and navigation-type application in running.

In some embodiments, whether a type of application belongs to a preset type of application may be preset by the user. For example, a procedure in which the user sets whether to allow an application to be checked and killed is described by using an example in which the electronic device is a mobile phone. FIG. 7A to FIG. 7D are schematic diagrams of graphical user interfaces (GUIs) in a procedure in which a user sets whether to allow an application to be checked and killed in memory management according to an embodiment of this application.

Figure 7A:
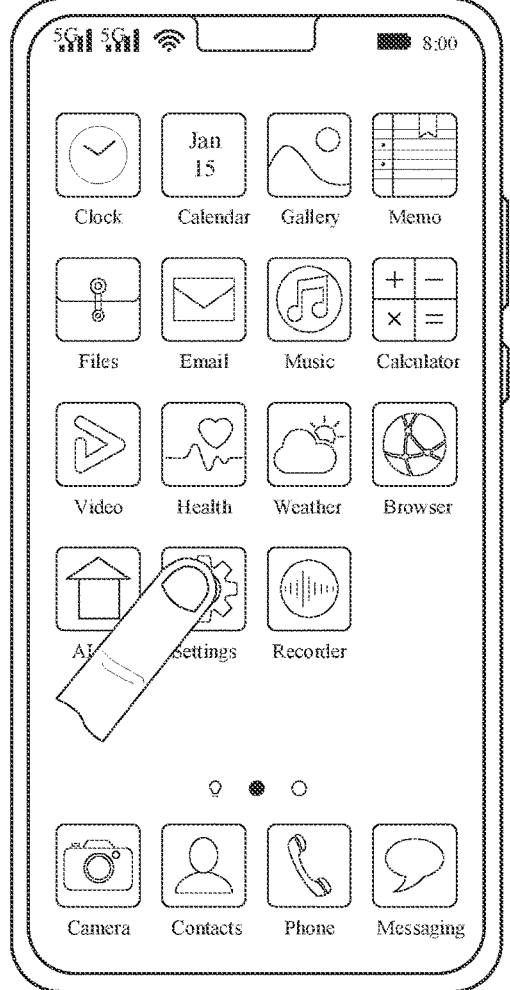
FIG. 7A to FIG. 7D are schematic diagrams of graphical user interfaces according to an embodiment of this application.

FIG. 7A shows screen content currently output on a mobile phone in an unlocked mode. The screen content includes a variety of applications (APPs), for example, clock, calendar, gallery, memo, files, email, music, calculator, video, health, weather, browser. AI life, settings, recorder, camera, contacts, phone, and messaging. It should be understood that in some embodiments, the screen may include more or fewer applications than shown in FIG. 7A. This is not limited in this embodiment of this application.

Figure 7B:
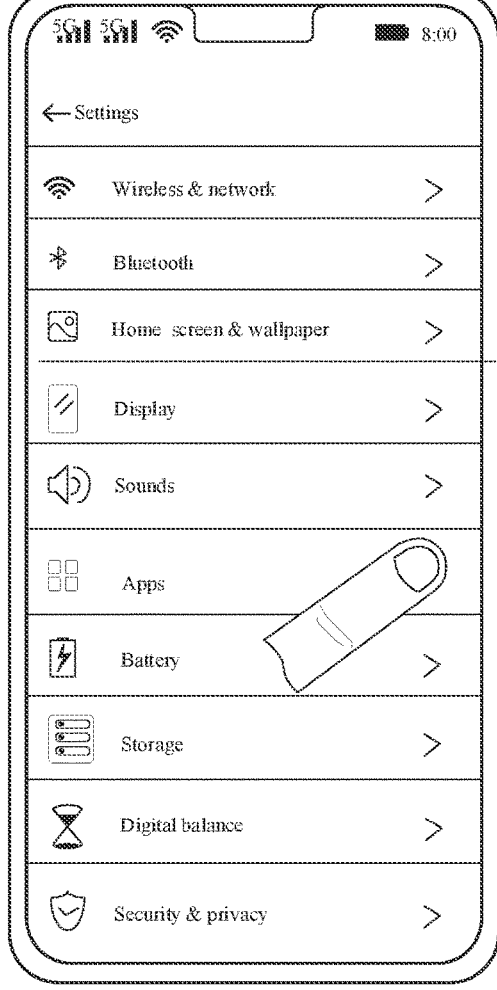

As shown in FIG. 7A, a user taps the settings icon, and in response to the tapping operation by the user, the mobile phone runs the settings application and displays a screen shown in FIG. 7B. The screen in FIG. 7B is the settings list screen. The settings list may include a plurality of options that the user can manipulate, and for example, include wireless & network. Bluetooth, home screen & wallpaper, display, sounds. Apps, battery, storage, digital balance, and security & privacy. It should be understood that in some embodiments, the screen may include more or fewer options than shown in FIG. 7B, or include different types of options than in FIG. 7B. This is not limited in this embodiment of this application.

Figure 7C:
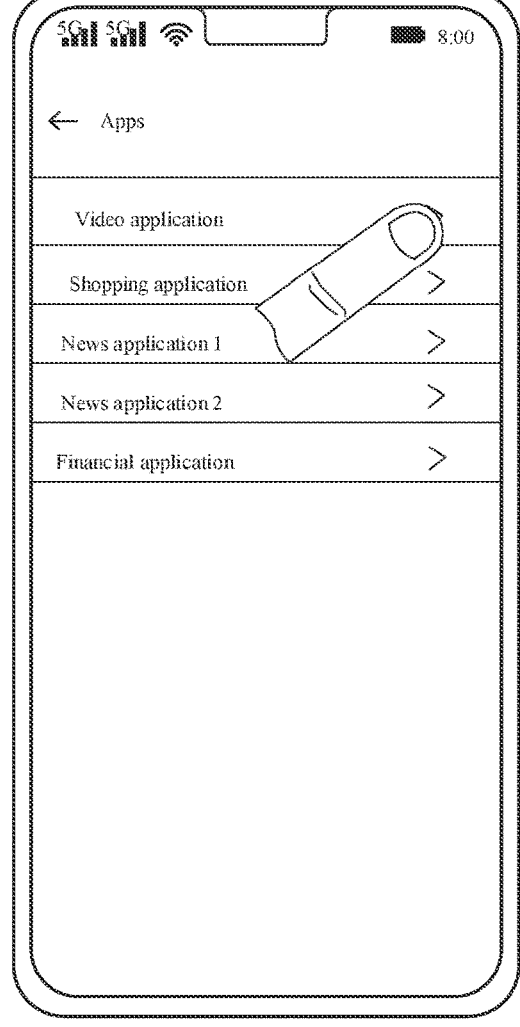

As shown in FIG. 7B, the user may tap Apps setting option, and in response to the tapping operation by the user, the mobile phone may display an Apps screen shown in FIG. 7C. As shown in FIG. 7C, the Apps screen may include a plurality of different types of applications installed in the mobile phone, for example, video applications, shopping applications, news applications (for example, news application 1 or news application 2), financial applications. Using a video application as an example, when the user needs to set the video application as a process that is not allowed to be killed when optimizing memory, the user may tap the video application, and in response to the tapping operation by the user, the mobile phone may display a video application permissions manager screen shown in FIG. 7D.

Figure 7D:
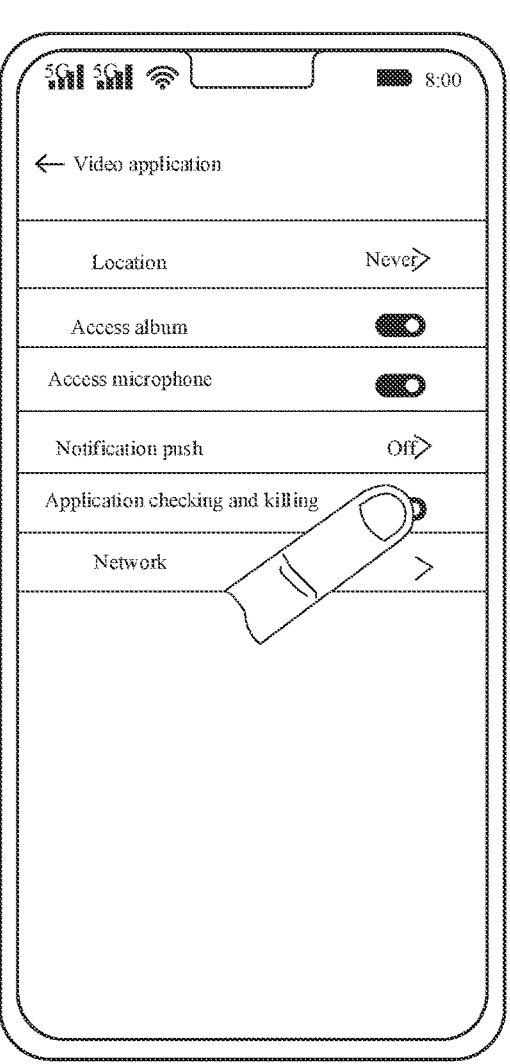

As shown in FIG. 7D, the video application permissions manager screen may include a plurality of setting bars for the video application permissions, for example, a management bar for location permissions, a management bar for album accessing permissions, a management bar for microphone accessing permissions, a management bar for notification push permissions, a management bar for application checking and killing permissions, and a management bar for network permissions. The user may set whether to allow checking and killing of the video application by tapping a switch control in the management bar for application checking and killing permissions. Tapping to enable the switch control means that video application is allowed to be checked and killed in case of memory exception, and tapping to disable the switch control means that video application is not allowed to be checked and killed in case of memory exception. It should be understood that when the video application is allowed to be checked and killed, the video application also belongs to a preset type of application.

It should be understood that whether a particular type of application belongs to a preset type of application, that is, whether the particular type of application is to be checked and killed when the trigger condition is met, may alternatively be set through a default policy. For example, a particular type of application is set as the preset type by default. Or the type of application may alternatively be set according to checking and killing notification information. For example, when a background application meets the checking and killing condition, the electronic device may inquire the user whether to agree to check and kill the background application, for example, displaying query information. If the user agrees, the type of the application is set to belong to the preset type, and if the user does not agree, the type of the application is set to not belong to the preset type. A specific manner of setting the type to which the application belongs is not limited in this embodiment of this application.

In some embodiments, if the type of the application matches the preset type, step S606 may be performed; and if the type of the application matches a second preset type, step S607 may be performed, that is, the application is kept running.

Figure 8:
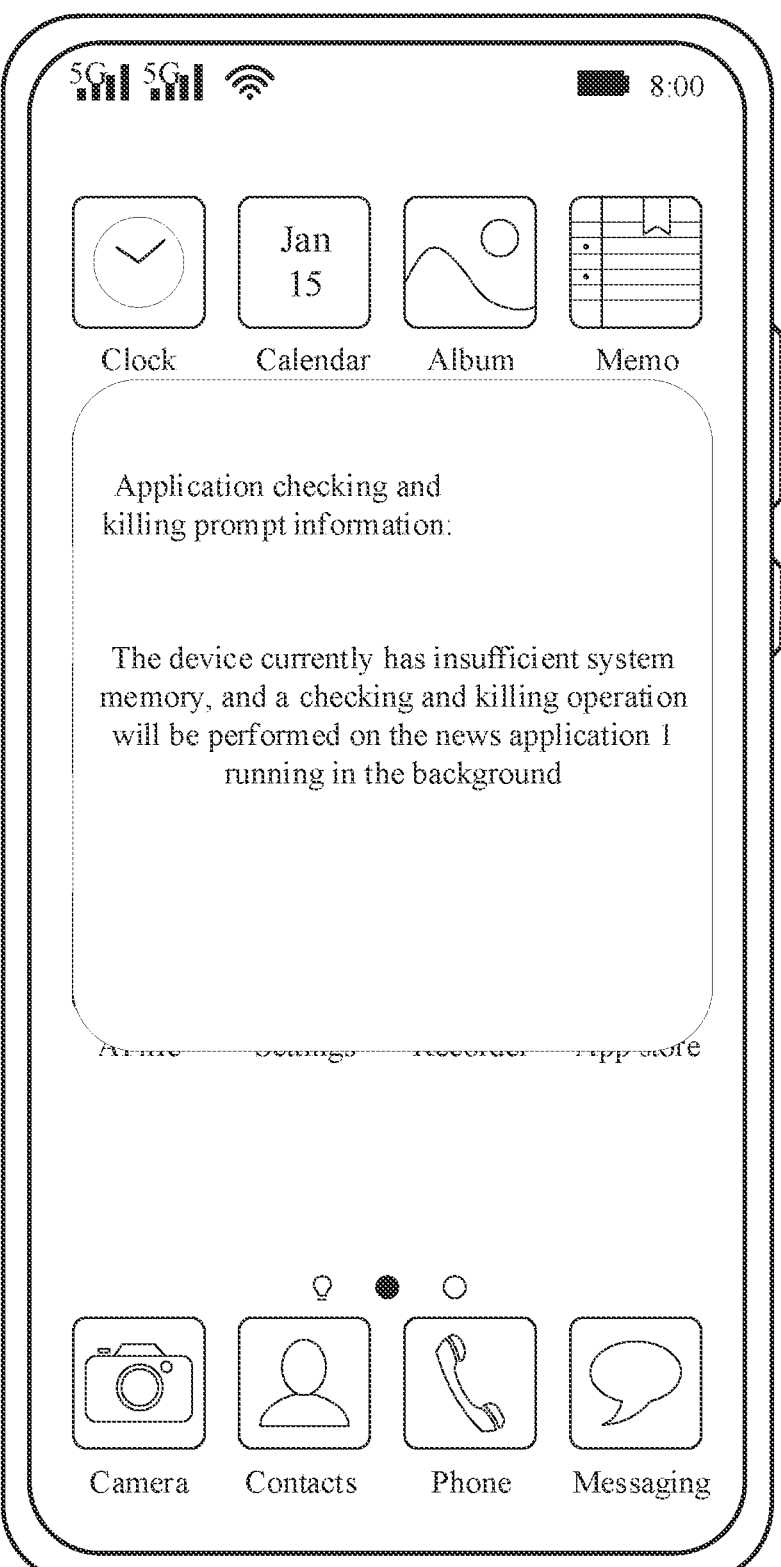
FIG. 8 is a schematic diagram of application checking and killing prompt information according to an embodiment of this application.

In some embodiments, to avoid direct checking and killing of some applications running in the background when the user wants to find a reason, prompt information that an application is about to be checked and killed may also be displayed to the user before the checking and killing. For example, as shown in FIG. 8, when it is determined that the type of the news application 1 in the background running state matches the preset type, the electronic device needs to perform a process-killing operation on the application. Before performing the process-killing operation, application checking and killing prompt information may pop up on the current screen of the electronic device (such as the home screen after the mobile phone is unlocked), where content of the prompt information may be, for example, "The device currently has insufficient system memory, and a checking and killing operation will be performed on the news application 1 running in the background", so that the user can learn in advance the reason why the background application is interrupted or forced to quit.

S606. Perform a process-killing operation on the application.

In some embodiments, a specific procedure of the electronic device performing a process-killing operation on the application may include: invoking android.os.process.killProcess (android.os.Process.myPid) or forcestoppackage process interface to clear memory occupied by processes of the application in the system memory, and the system memory cleared may be reallocated by a memory allocation module of the electronic device.

Optionally, after the process-killing operation is performed on the application, the application may alternatively be restarted so that the application runs in a normal state without memory leak.

The memory management method provided in this embodiment of this application checks and kills a specific application by combining multi-dimensional information such as an application scenario of the application according to an abnormal memory occupancy situation in a running application, so that under the premise of meeting different needs of users for use of applications, the system memory is optimized and user experience is improved.

Figure 9:
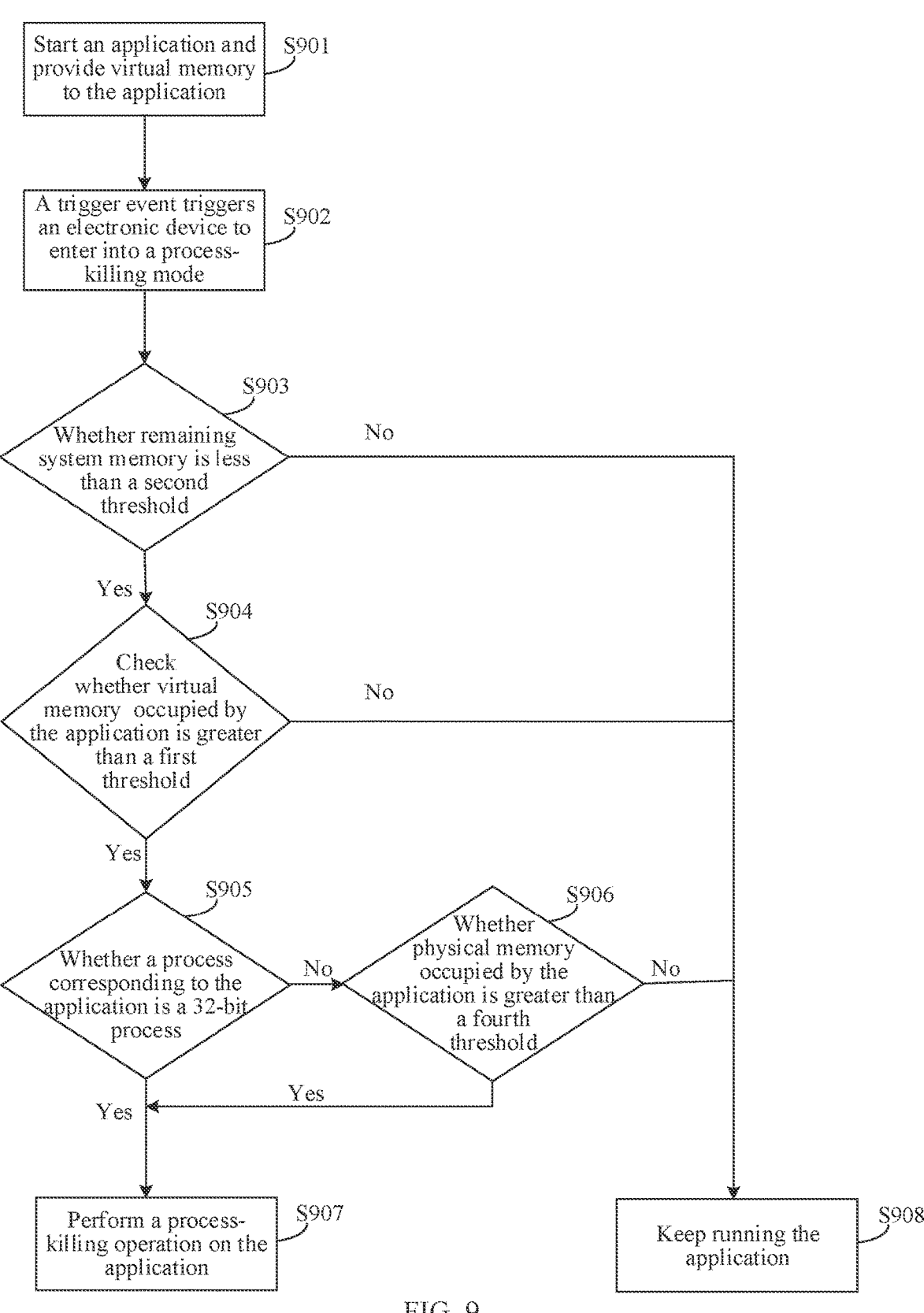
FIG. 9 is a schematic flowchart of still another memory management method according to an embodiment of this application.

It should be understood that an existing LMK checking and killing mechanism checks and kills a process according to an adj priority, and generally does not check and kill an application running in the foreground. Therefore, if a memory leak occurs in the application running in the foreground and causes insufficient system memory, the problem cannot be effectively resolved. In response to this situation, in the memory management method provided in this embodiment of this application, the application running in the foreground may also be checked and killed. For example, FIG. 9 is a schematic flowchart of performing memory management on an application in a foreground running state according to an embodiment of this application. This process flow may be performed by the electronic device and include the following steps.

S901. Start an application and provide virtual memory to the application.

This step may correspond to step S401. For related description, reference may be made to the foregoing content. Details are not repeated herein.

S902. A trigger event triggers an electronic device to enter a process-killing mode.

In some embodiments, the trigger event may correspond to the electronic device meeting a first preset condition. For example, the system memory is in a low memory state; or, a preset check cycle is reached; or the like.

The process-killing mode herein may include a virtual memory check procedure, a checking and killing condition check procedure, a process-killing operation, and the like. The electronic device entering into the process-killing mode means that the electronic device starts to perform operations such as virtual memory check and process bitness check on the foreground application.

S903. Check whether system physical memory is less than a second threshold.

It should be understood that the foreground application may be an application in use by the user, and is of high importance to the user. Therefore, before virtual memory check is performed on the foreground application, it is necessary to check whether a second preset condition is met. The second preset condition, for example, may be that a remaining physical memory space of the electronic device is less than a second threshold, and the second threshold, for example, is 200 MB or 300 MB.

In some embodiments, when the electronic device detects that the remaining physical memory space is less than the second threshold, the electronic device may be triggered to perform step S904. The second threshold, for example, may be set to 200 MB or 300 MB. This is not limited in this application.

The procedure of the electronic device checking whether the remaining amount of physical memory is less than a preset threshold may include: invoking, by the electronic device, an activitymanager.getmemory Info interface via a memory exception analysis module to obtain the current remaining physical memory of the system, and then comparing to determine whether the remaining amount of physical memory is less than a preset threshold.

S904. Check whether virtual memory occupied by the application is greater than a first threshold.

In some embodiments, there is a correspondence between the first threshold and the bitness of the process run by the application, and the first threshold is set according to a maximum virtual memory supported by the process with target bitness. For example, for a 32-bit process, because the maximum virtual memory that the process can support is 4 GB, the first threshold may be set to a value close to 4 GB, for example, 3.2 GB or 3.5 GB.

S905. Check whether a process corresponding to the application is a 32-bit process.

It should be understood that detecting in step S904 that the virtual memory space occupied by the foreground application is greater than the first threshold means that a memory leak may occur in the application, but alternatively may include a situation in which a process with other bitness occupies the memory normally. For example, when virtual memory occupied by the application is greater than 3.5 GB, but the bitness of the application is 64; in this case, there may be no memory leak. Therefore, in order to accurately estimate whether a memory leak occurs in the application, the electronic device may further check whether the process run by the application is a process with target bitness, that is, estimate whether the process run by the application corresponds to the preset threshold, and if yes, meaning that the virtual content occupied by the application has reached a corresponding virtual memory occupancy limit (that is, the preset threshold), the electronic device can determine that a memory leak actually occurs in the application.

The procedure of the electronic device checking whether an application is a 32-bit process may be that the electronic device uses a corresponding pid of the application to invoke an interface, views relevant file directory of a corresponding process file system, and obtains an application bit type. For details, reference may be made to the descriptions of the related content above. Details are not repeated herein.

In some embodiments, when detecting that the process run by the application is a 32-bit process, the electronic device may perform step S907 to perform a process-killing operation on the application; and if detecting that the process run by the application is a non 32-bit process, the electronic device performs step S906 to further estimate whether physical memory occupied by the application is greater than a fourth threshold.

S906. Check whether physical memory occupied by the application is greater than the fourth threshold.

In some embodiments, the procedure of the electronic device estimating physical memory occupied by the application may include: invoking an activitymanager.getmemory Info interface via the memory exception analysis module, and querying to obtain physical memory occupied by the application from VmRSS (physical memory) in the/proc/pid/status file in the system database.

In some embodiments, if it is detected that the physical memory occupied by the application is greater than the fourth threshold, step S907 may be performed to perform a process-killing operation on the application; and if it is detected that the physical memory occupied by the application is equal to or less than the fourth threshold, step S908 may be performed, that is, the application is kept running. For example, the fourth threshold may be 1 GB or 2 GB. This is not limited in this application.

The memory management method provided in this embodiment of this application checks and kills a specific application by combining multi-dimensional information such as an application scenario of the application according to an abnormal memory occupancy situation in a running application, so that under the premise of meeting different needs of users for use of applications, the system memory is optimized and user experience is improved.

For example, an embodiment of this application further provides a computer-readable storage medium, where the computer-readable storage medium stores a computer program, the computer program includes instructions, and when the instructions are invoked by a computer, the computer is enabled to perform the memory management method according to the embodiments of this application.

An embodiment of this application further provides a chip system, including: a communications interface, configured to input and/or output information; a memory, configured to store a computer executable program; and a processor, configured to execute the computer executable program to enable a device with the chip system installed to perform the memory management method according to the embodiments of this application.

An embodiment of this application further provides a computer program product, where the computer program product includes computer program instructions, and when the computer program instructions run on a computer, the computer is enabled to perform the memory management method according to the embodiments of this application.

All or some of the foregoing embodiments may be implemented by software, hardware, firmware, or any combination thereof. When the functions are implemented by software, all or some of the functions may be implemented in a form of a computer program product. The computer program product includes one or more computer instructions. When the computer program instructions are loaded and executed on the computer, the procedures or functions according to the embodiments of this application are all or partially generated. The computer may be a general-purpose computer, a special-purpose computer, a computer network, or other programmable apparatuses. The computer instruction may be stored in a computer-readable storage medium, or may be transmitted by using the computer-readable storage medium. The computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

A person of ordinary skill in the art may understand that all or some of the processes of the methods in the foregoing embodiments may be implemented by a computer program instructing relevant hardware. The program may be stored in a computer-readable storage medium. When the program is executed, the processes in the foregoing method embodiments are performed. The storage medium includes various media that can store program code, such as a read-only memory (ROM), a random access memory (RAM), a magnetic disk, or an optical disc.

The foregoing descriptions are merely specific implementations of the embodiments of this application, but are not intended to limit the protection scope of the embodiments of this application. Any variation or replacement within the technical scope disclosed in the embodiments of this application shall fall within the protection scope of the embodiments of this application. Therefore, the protection scope of the embodiments of this application shall be subject to the protection scope of the claims.

What is claimed is:

1. A memory management method, comprising:
starting, by an electronic device, an application;
providing, by the electronic device, virtual memory to the application;
checking, by the electronic device, a space of the virtual memory occupied while the application is running;
checking, by the electronic device, bitness of a process run by the application based on the space of the virtual memory occupied being greater than a first threshold, wherein the bitness of the process indicates that the process run by the application is a 32-bit process or a 64-bit process, and wherein the first threshold is based on the bitness of the process run by the application; and
performing, by the electronic device, a process-killing operation on the application based on the process run by the application being the 32-bit process and the application being running in a foreground of the electronic device.

2. The method according to claim 1, wherein the method further comprises:
   checking a duration for which the application has been in a background running state; and
   performing the process-killing operation on the application based on the duration for which the application has been in the background running state being longer than a preset duration.

3. The method according to claim 2, wherein the performing the process-killing operation on the application based on the duration for which the application has been in the background running state being longer than the preset duration comprises:
   checking a type of the application based on the duration for which the application has been in the background running state being longer than the preset duration; and
   performing the process-killing operation on the application based on the type of the application being a preset type, wherein the type of the application being the preset type is based on querying a user.

4. The method according to claim 3, wherein the preset type of the application comprises at least one of the following:
   a communication-type application type;
   a tool-type application type;
   a shopping-type application type; or
   a news-type application type.

5. The method according to claim 1, wherein based on the application being in the foreground running state, the method further comprises:
   checking a remaining physical memory space in the electronic device; and
   checking a space of the virtual memory occupied while the application is running based on one or more of the following conditions being satisfied:
   the remaining physical memory space is less than a second threshold; or
   the remaining physical memory space in the electronic device is up to a preset level; or
   a rate at which the application requests the virtual memory is greater than a third threshold.

6. The method according to claim 5, wherein the method further comprises:
   checking a space of physical memory occupied while the application is running based on the process run by the application being a non 32-bit process; and
   performing the process-killing operation on the application based on the physical memory space occupied being greater than a fourth threshold.

7. An electronic device, comprising:
   one or more processors; and
   one or more memories that store one or more computer programs, wherein the one or more computer programs comprise instructions, and when the instructions are executed by the one or more processors, the electronic device is enabled to perform a memory management method comprising:
   starting an application;
   providing virtual memory to the application;
   checking a space of the virtual memory occupied while the application is running;
   checking bitness of a process run by the application based on the space of the virtual memory occupied being greater than a first threshold, wherein the bitness of the process indicates that the process run by the application is a 32-bit process or a 64-bit process, and wherein the first threshold is based on the bitness of the process run by the application; and
   performing a process-killing operation on the application based on the process run by the application being the 32-bit process and the application being running in a foreground of the electronic device.

8. A chip system, comprising:
   a communications interface, configured to input and/or output information;
   a memory, configured to store a computer executable program; and
   a processor, configured to execute the computer executable program to enable a device with the chip system installed to perform a memory management method comprising:
   starting an application;
   providing virtual memory to the application;
   checking a space of the virtual memory occupied while the application is running;
   checking bitness of a process run by the application based on the space of the virtual memory occupied being greater than a first threshold, wherein the bitness of the process indicates that the process run by the application is a 32-bit process or a 64-bit process, and wherein the first threshold is based on the bitness of the process run by the application; and
   performing a process-killing operation on the application based on the process run by the application being the 32-bit process and the application being running in a foreground of an electronic device.

9. The chip system according to claim 8, wherein the memory management method further comprises:
   checking a duration for which the application has been in a background running state; and
   performing the process-killing operation on the application based on the duration for which the application has been in the background running state being longer than a preset duration.

10. The chip system according to claim 9, wherein the performing the process-killing operation on the application based on the duration for which the application has been in the background running state being longer than the preset duration comprises:
   checking a type of the application based on the duration for which the application has been in the background running state being longer than the preset duration; and
   performing the process-killing operation on the application based on the type of the application being a preset type, wherein the type of the application being the preset type is based on querying a user.

11. The chip system according to claim 10, wherein the preset type of the application comprises at least one of the following:
   a communication-type application type;
   a tool-type application type;
   a shopping-type application type; or
   a news-type application type.

12. The chip system according to claim 8, wherein based on the application being in the foreground running state, the memory management method further comprises:
   checking a remaining physical memory space in the electronic device; and
   checking a space of the virtual memory occupied while the application is running based on one or more of the following conditions being satisfied:

the remaining physical memory space is less than a second threshold; or the remaining physical memory space in the electronic device is up to a preset level; or a rate at which the application requests the virtual memory is greater than a third threshold.

13. The chip system according to claim 12, wherein the memory management method further comprises:

checking a space of physical memory occupied while the application is running based on the process run by the application being a non 32-bit process; and performing the process-killing operation on the application based on the physical memory space occupied being greater than a fourth threshold.

14. The electronic device according to claim 7, wherein the memory management method further comprises:

checking a duration for which the application has been in a background running state; and performing the process-killing operation on the application based on the duration for which the application has been in the background running state being longer than a preset duration.

15. The electronic device according to claim 14, wherein the performing the process-killing operation on the application based on the duration for which the application has been in the background running state being longer than the preset duration comprises:

checking a type of the application based on the duration for which the application has been in the background running state being longer than the preset duration; and performing the process-killing operation on the application based on the type of the application being a preset type, wherein the type of the application being the preset type is based on querying a user, wherein querying the user comprises presenting graphical user interfaces that enable the user to select a switch control in a management bar for a plurality of applications of the electronic device.

16. The electronic device according to claim 15, wherein the preset type of the application comprises at least one of the following:

a communication-type application type;

a tool-type application type;

a shopping-type application type; or a news-type application type.

17. The electronic device according to claim 7, wherein based on the application being in the foreground running state, the memory management method further comprises:

checking a remaining physical memory space in the electronic device; and checking a space of the virtual memory occupied while the application is running based on one or more of the following conditions being satisfied:

the remaining physical memory space is less than a second threshold; or the remaining physical memory space in the electronic device is up to a preset level; or a rate at which the application requests the virtual memory is greater than a third threshold.

18. The electronic device according to claim 17, wherein the memory management method further comprises:

checking a space of physical memory occupied while the application is running based on the process run by the application being a non 32-bit process; and performing the process-killing operation on the application based on the physical memory space occupied being greater than a fourth threshold.

19. The method according to claim 3, wherein querying the user comprises presenting graphical user interfaces that enable the user to select a switch control in a management bar for a plurality of applications of the electronic device.

20. The chip system according to claim 10, wherein querying the user comprises presenting graphical user interfaces that enable the user to select a switch control in a management bar for a plurality of applications of the electronic device.

* * * * *